US012791124B2

United States Patent
Cheng

(12) United States Patent

(10) Patent No.: US 12,791,124 B2

(45) Date of Patent: Nov. 10, 2026

(54) OPERATION SWITCH, OPERATION MECHANISM, PULL-OUT OPERATION DEVICE, PULL-OUT CONTROL MECHANISM, AND PULL-OUT DEVICE

(71) Applicant: Beijing Kohler Ltd., Beijing (CN)

(72) Inventor: Guang Cheng, Beijing (CN)

(73) Assignee: Beijing KOHLER Ltd., Beijing (CN)

( * ) Notice: Subject to any disclaimer, the term of this patent is extended or adjusted under 35 U.S.C. 154(b) by 49 days.

(21) Appl. No.: 18/899,941

(22) Filed: Sep. 27, 2024

(65) Prior Publication Data

US 2025/0020241 A1 Jan. 16, 2025

Related U.S. Application Data

(63) Continuation of application No. 17/529,126, filed on Nov. 17, 2021, now Pat. No. 12,123,527.

(30) Foreign Application Priority Data

Nov. 20, 2020 (CN) ........................ 202011312621.5
Nov. 20, 2020 (CN) ........................ 202022714371.X
Nov. 24, 2020 (CN) ........................ 202022751634.4

(51) Int. Cl.
*F16L 3/18* (2006.01)
*E03C 1/04* (2006.01)

(52) U.S. Cl.
CPC .................. *F16L 3/18* (2013.01); *E03C 1/04* (2013.01); *E03C 2001/0415* (2013.01)

(58) Field of Classification Search
CPC ............... E03C 1/04; E03C 2001/0415; E03C 2001/0417; Y10T 137/9464; Y10T 137/6962; Y10T 137/6943; B65H 75/34
See application file for complete search history.

(56) References Cited

U.S. PATENT DOCUMENTS

| | | | |
|---|---|---|---|
| 6,491,248 | B1 | 12/2002 | Liu |
| 6,915,816 | B2 | 7/2005 | Nelson |
| 10,745,895 | B2 | 8/2020 | Li |
| 11,085,175 | B2 | 8/2021 | Fourman |
| 2023/0089841 | A1 | 3/2023 | Liao |
| 2023/0313510 | A1 | 10/2023 | Cheng |
| 2023/0356974 | A1 | 11/2023 | Wang |

FOREIGN PATENT DOCUMENTS

| | | | |
|---|---|---|---|
| CN | 106122633 | A | 11/2016 |
| CN | 110747949 | A | 2/2020 |
| CN | 114622629 | A | 6/2022 |
| CN | 107190814 | B | 11/2022 |
| EP | 2312065 | A1 | 4/2011 |
| EP | 2440486 | A1 | 4/2012 |
| FR | 2927778 | A1 | 8/2009 |
| KR | 20040041004 | A | 5/2004 |
| WO | 2023044428 | A1 | 3/2023 |

*Primary Examiner* — Daphne M Barry

(74) *Attorney, Agent, or Firm* — Lempia Summerfield Katz LLC

(57) ABSTRACT

A pull-out control mechanism includes a swing locking member comprising a swing member configured to swing; a first rotating wheel configured to rotate relative to the swing locking member; and a rotation locking member disposed on the first rotating wheel, the rotation locking member comprising an actuating member configured to actuate the swing member in response to a rotation of the first rotating wheel. The actuated swing member is configured to be locked or disengaged with the actuating member.

19 Claims, 19 Drawing Sheets

OPERATION SWITCH, OPERATION MECHANISM, PULL-OUT OPERATION DEVICE, PULL-OUT CONTROL MECHANISM, AND PULL-OUT DEVICE

CROSS REFERENCE TO RELATED APPLICATION

This application is a continuation application of co-pending U.S. patent application Ser. No. 17/529,126, filed Nov. 17, 2021, and which claims the benefit of priority to: Chinese Patent Application No. 202022751634.4 filed in the Chinese Intellectual Property Office on Nov. 24, 2020, the contents of which are hereby incorporated by reference in its entirety; Chinese Patent Application No. 202022714371.X filed in the Chinese Intellectual Property Office on Nov. 20, 2020, the contents of which are hereby incorporated by reference in its entirety; and Chinese Patent Application No. 202011312621.5 filed in the Chinese Intellectual Property Office on Nov. 20, 2020, the contents of which are hereby incorporated by reference in its entirety.

FIELD

The present disclosure relates to a technical field of operating or controlling via pulling a hose/cord. In particular, the present disclosure relates to an operation switch, an operation mechanism, and a pull-out operation device.

The present disclosure also relates to the technical field of hose/cord pull-out control. More particularly, the present disclosure relates to a pull-out control mechanism and a pull-out device.

BACKGROUND

A pull-out faucet is often used in everyday life of people, for example, a basin faucet used in a kitchen. When a user needs to pull out the faucet, he pulls the hose outwardly or upwardly. After the hose is pulled out and then released, the hose is temporally positioned in place.

The operation mechanism for temporally positioning the hose employs dual rolling wheels for operation. The temporal positioning is implemented by limiting one of the rolling wheels. Operation mechanisms employing dual rolling wheels have complex structures and are costly.

In view of the above, it is desired to provide an operation switch, an operation mechanism, and a pull-out device that have simple structures and are easy to use.

In addition, in the sanitary industry, a pull-out kitchen faucet or basin faucet has to be used by applying a pulling force to a hose all the time after the hose is pulled out. Otherwise, the hose will retract under the action of a weighting block, which leads to great inconvenience in use.

In view of this, it is desired to provide a pull-out control mechanism and a pull-out device, which can realize suspending and positioning of a hose/cord.

SUMMARY

An object of the present disclosure is to provide an operation switch, an operation mechanism and a pull-out operation device, which have simple structures and are easy to use.

According to an aspect, the present disclosure provides an operation switch including a housing having a mounting cavity, an end cap mounted on the housing, a slider equipped within the mounting cavity and movable upwardly and downwardly, a sliding pin equipped between the end cap and the slider, and a positioning pin slidably connecting with the slider.

The housing has a housing opening in communication with the mounting cavity at the side of the housing away from the end cap, and the slider has a slider stop plate extending out from the housing opening.

The end cap has a guide sliding chute, and the sliding pin is in clearance fit with the guide sliding chute.

The guide sliding chute has a lower positioning recess and an upper positioning recess for limiting the position of the sliding pin.

The guide sliding chute also has a guide ramp below the guide sliding chute, and one end of the positioning pin slidably contacts or touches the guide ramp.

A first resilient member is provided between the slider and the positioning pin, for biasing the positioning pin toward the end cap.

When the sliding pin is located within the lower positioning recess, the positioning pin is received within the mounting cavity.

When the sliding pin is located within the upper positioning recess, the positioning pin at least partly extends out from the housing opening.

In an embodiment, the guide sliding chute is heart-shaped.

The slider has a slider hole, the sliding pin passes through the slider hole and is movable in the slider hole along the width direction of the slider.

In another embodiment, a second resilient member for biasing the sliding pin toward the end cap locates is equipped between the slider and the sliding pin.

In another embodiment, a third resilient member for biasing the slider downwardly is provided between the housing and the slider.

In another embodiment, the positioning pin includes a positioning pin mating end and a positioning pin body, which are connected together.

Correspondingly, a slider through-hole is provided on the slider, wherein the positioning pin body is in clearance fit with the slider through-hole, and the positioning pin mating end slidably contacts or touches the guide ramp.

The first resilient member is provided between the positioning pin body and the slider.

In an embodiment, the surface of the positioning pin mating end toward the guide ramp is a curved surface.

In an embodiment, the end cap is connected with the housing via snap fit.

According to another aspect, the present disclosure further provides an operation mechanism including a sleeve, a guide sleeve that can enter and exit the sleeve via a bottom opening of the sleeve, and an operation switch according to any of the preceding embodiments.

The housing is mounted on the sleeve, and the slider stop plate is located within the sleeve.

A guide sleeve flange that can lift up the slider stop plate is provided on the guide sleeve.

When the sliding pin is located within the upper positioning recess, the positioning pin is at least partly located within the sleeve, and the guide sleeve flange can be stopped by the positioning pin and thus be prevented from falling down.

In an embodiment, the housing and the sleeve are formed integrally.

According to another aspect, the present disclosure further provides a pull-out operation device including a hose/cord and an operation mechanism according to preceding embodiments.

The hose/cord passes through the sleeve.

The guide sleeve is tightly secured around the hose/cord.

When the hose/cord is in an initial condition, the guide sleeve is located below the sleeve.

When the hose/cord is in a condition of being pulled upwardly, the guide sleeve is located within the sleeve, and the guide sleeve flange slidably contacts or touches the slider stop plate.

When the hose/cord is in a suspended condition, the guide sleeve is located within the sleeve, and the guide sleeve flange contacts or touches the positioning pin.

The present disclosure may bring the following beneficial technical effects: with the operation switch, the operation mechanism and the pull-out operation device provided by the present disclosure, when the slider is in an initial condition, the sliding pin is located within the lower positioning recess, and the positioning pin retracts into the housing without hindering the guide sleeve from moving upwardly to enter the sleeve. When the hose/cord is pulled upwardly, the guide sleeve enters the sleeve, the slider is driven by the guide sleeve to move upwardly, the sliding pin is driven into the upper positioning recess, and the positioning pin extends out from the housing opening and into the sleeve. When the hose/cord is released, the guide sleeve falls down on the positioning pin, and its position is temporally limited by the positioning pin. At this time, the hose/cord temporally stops falling, and the user can continue to use the device. When the hose/cord is pulled out again, the sliding pin is disengaged with the upper positioning recess and can enter the lower positioning recess as the slider falls down, and the positioning pin retracts without hindering the guide sleeve. The hose/cord can be restored to its initial condition.

The operation switch, the operation mechanism, and the pull-out operation device provided by the present disclosure have simple structures, are easy to mount and operate, with low cost and high practical applicability.

The present disclosure is intended to provide a pull-out control mechanism and a pull-out device, which can realize suspending and positioning of a hose/cord.

According to an aspect, the present disclosure provides a pull-out control mechanism, which includes:

a housing;

a hose/cord clamping wheel set including a first rotating wheel and a second rotating wheel, which are mounted in the housing; and a locking and releasing mechanism including a swing locking member mounted on the housing and a rotation locking member mounted on the first rotating wheel; the swing locking member includes a swing member capable of swinging in the housing, and the rotation locking member includes an actuating member capable of actuating the swing member.

When the first rotating wheel rotates in a first direction for the first time, the actuating member is capable of actuating the swing member in the first direction and passing over the swing member.

When the first rotating wheel rotates in a second direction opposite to the first direction for the first time, the actuating member is capable of actuating the swing member in the second direction, and the swing member is locked together with the rotation locking member.

When the first rotating wheel rotates in the first direction again, the swing member is disengaged with the rotation locking member, and the swing member is in a free swinging status.

When the first rotating wheel rotates in the second direction again, the actuating member is capable of passing over the swing member that is in the free swinging status.

In an embodiment, the swing locking member further includes an elastic member mounted in the housing for biasing the swing member.

In another embodiment, the elastic member includes a first elastic strip and a second elastic strip, which are spaced apart.

A pivot shaft of the swing member is located between the first elastic strip and the second elastic strip.

An end portion of the swing member extends out from an opening between the first elastic strip and the second elastic strip, and the swing member is also provided with a swing member bulge located between the first elastic strip and the second elastic strip;

An elastic member bulge is arranged on the side of the second elastic strip facing the swing member.

The swing member bulge is capable of passing over the elastic member bulge and is capable of being limited by the elastic member bulge.

In another embodiment, when the first rotating wheel rotates in the first direction for the first time, the swing member bulge passes over the elastic member bulge and is limited by the elastic member bulge.

When the first rotating wheel rotates in the second direction for the first time, the swing member bulge passes back over the elastic member bulge.

When the first rotating wheel rotates in the first direction again, the swing member is capable of swinging freely.

In another embodiment, the rotation locking member further includes a circular ring arranged at one end of the first rotating wheel and a boss arranged on the circular ring.

The actuating member is connected with the boss, and a locking groove for locking the end portion of the swing member is formed at the joint between the actuating member and the boss.

When the first rotating wheel rotates in the second direction for the first time, the end portion of the swing member is located in the locking groove.

When the first rotating wheel rotates in the first direction again, the end portion of the swing member is capable of passing over the boss.

In an embodiment, the outer diameter of the circular ring is R, the distance between the center of the circular ring and the rotation center of the swing member is L, the distance between the locking groove and the center of the circular ring is L1, and the distance from the end portion of the swing member to the rotation center of the swing member is L2.

Then, $L1+L2$ is greater than L, and $R+L2$ is less than L.

In another embodiment, a fixed shaft is arranged in the housing, and the first rotating wheel is sleeved on the fixed shaft;

The second rotating wheel is mounted in the housing through a sliding shaft, the second rotating wheel is sleeved on the sliding shaft, and the sliding shaft is capable of moving towards the fixed shaft.

An elastic driving mechanism for biasing the sliding shaft towards the fixed shaft is arranged between the housing and the sliding shaft.

In another embodiment, corresponding to the two ends of the sliding shaft, guide grooves extending towards the fixed shaft are provided in the housing, respectively.

The two ends of the sliding shaft are respectively in clearance fit with the two guide grooves.

In each guide groove, one elastic driving mechanism is provided.

In another embodiment, the elastic driving mechanism includes a jacking block for abutting against the sliding shaft and an elastic member for biasing the jacking block towards the sliding shaft.

The jacking block is slidably arranged in the guide groove, one end of the elastic member is fixed to the housing, and the other end of the elastic member is kept in contact with the jacking block.

According to another aspect, the present disclosure further provides a pull-out device, which includes a hose/cord and the pull-out control mechanism according to any of the above embodiments.

Two opposite sides of the housing are respectively provided with a housing through hole for the hose/cord to pass through.

The hose/cord passes through the housing through holes and passes between the first rotating wheel and the second rotating wheel.

When the hose/cord is pulled outwardly for the first time, the first rotating wheel rotates in the first direction for the first time, the actuating member is capable of actuating the swing member in the first direction and passing over the swing member, and the hose/cord is capable of being pulled out.

When the hose/cord is released for the first time, the first rotating wheel rotates in the second direction for the first time, the actuating member is capable of actuating the swing member in the second direction, the swing member is locked with together the rotation locking member, and the hose/cord is capable of being clamped and positioned by the hose/cord clamping wheel set.

When the hose/cord is pulled outwardly again, the first rotating wheel rotates in the first direction again, the swing member is disengaged with the rotation locking member, and the swing member is in the free swinging status.

When the hose/cord is released again, the first rotating wheel rotates in the second direction again, the actuating member is capable of passing over the swing member that is in the free swinging status, and the hose/cord is capable of being restored to its original position.

By adopting the above embodiments, the present disclosure has the following beneficial effects.

In the pull-out control mechanism and the pull-out device provided by the present disclosure, when the hose/cord is drawn for the first time, the hose/cord may be pulled out, after the hose/cord is released for the first time, the hose/cord may be clamped and positioned by the hose/cord clamping wheel set, so that the hose/cord does not need to be drawn by an external force, when the hose/cord is drawn for the second time, the swing member is disengaged with the rotation locking member, so that the first rotating wheel may go on rotating, and when the hose/cord is released for the second time, the hose/cord is retracted and returned back to its original position.

Therefore, the pull-out control mechanism and the pull-out device provided by the present disclosure can realize suspending and positioning of the hose/cord without having to draw the hose/cord by an external force, which are easy and convenient to operate and have high practicability.

BRIEF DESCRIPTION OF THE FIGURES

The present disclosure is further described in detail hereinafter with reference to the accompanying drawings and the specific embodiments.

DETAILED DESCRIPTION

Figure 1:
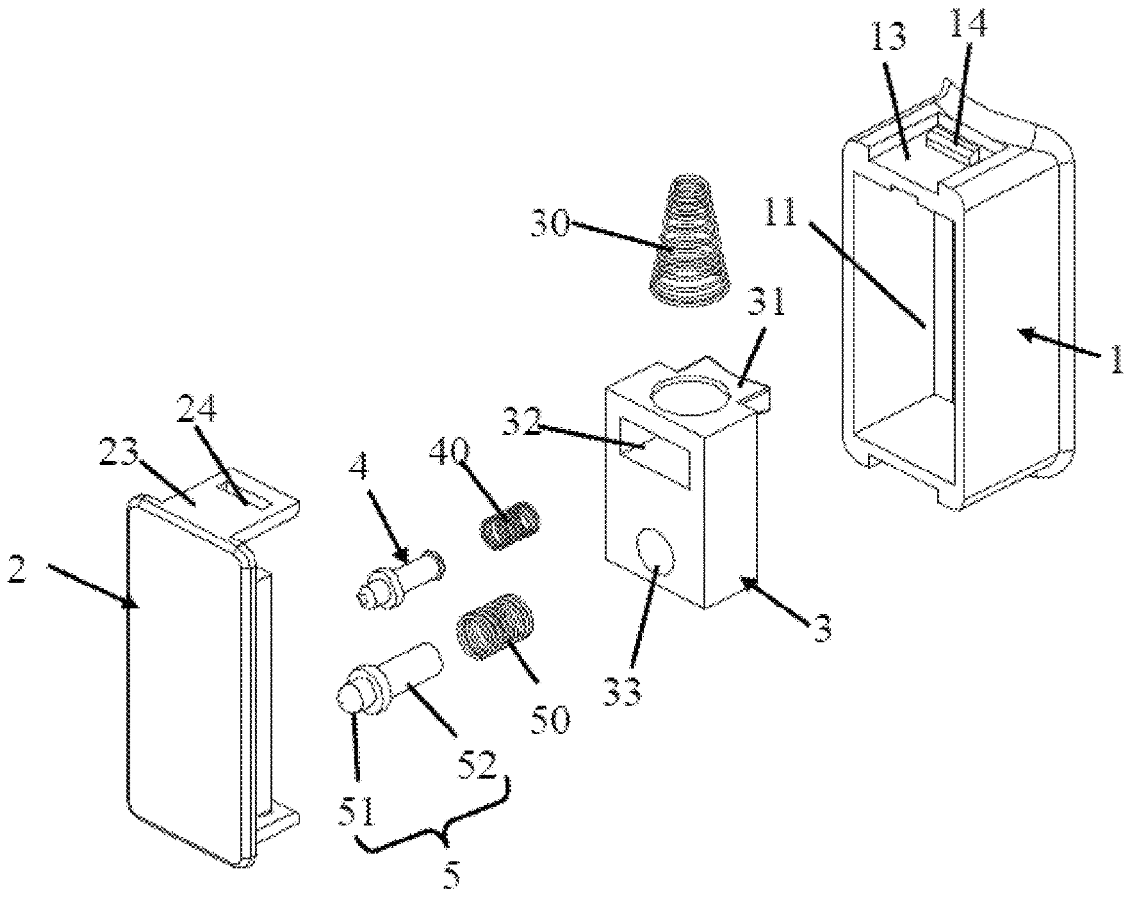
FIG. 1 is an exploded view of an operation switch provided by an embodiment of the present disclosure.

First Embodiment: Operation Switch, Operation Mechanism, and Pull-Out Operation Device Hereinafter the detailed embodiments of the present disclosure will be described by reference to the drawings. Like reference numerals refer to like elements. It should be noted that, the wordings of "front", "back", "left", "right", "up", and "down" used in the following description refer to the directions in the drawings; and the wordings of "inner" and "outer" refer to the directions toward or away from the geometric center of a specific component, respectively.

Figure 2:
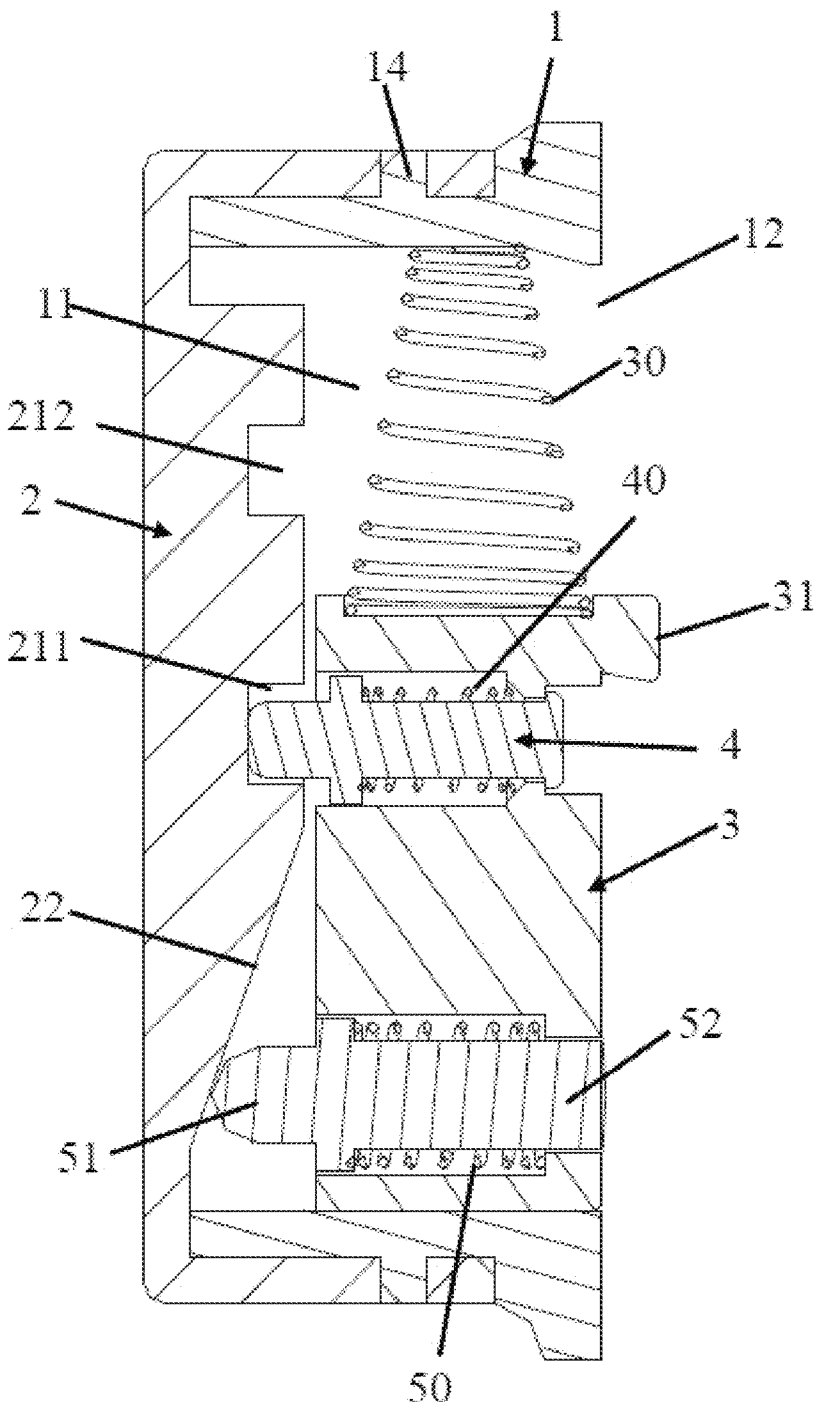
FIG. 2 is a sectional view of the operation switch with a sliding pin being located within a lower positioning recess.
Figure 3:
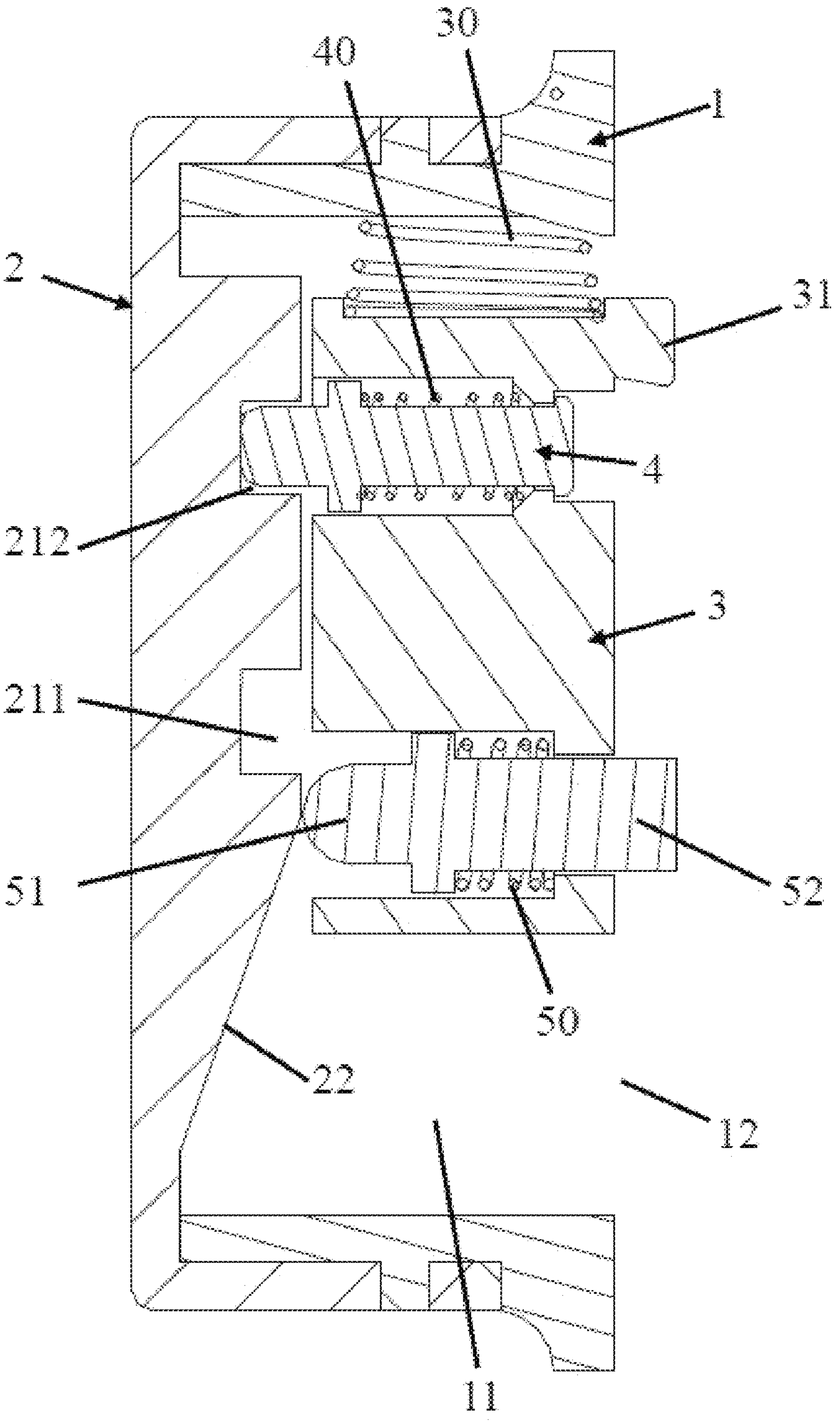
FIG. 3 is a sectional view of the operation switch with the sliding pin being located within an upper positioning recess.
Figure 4:
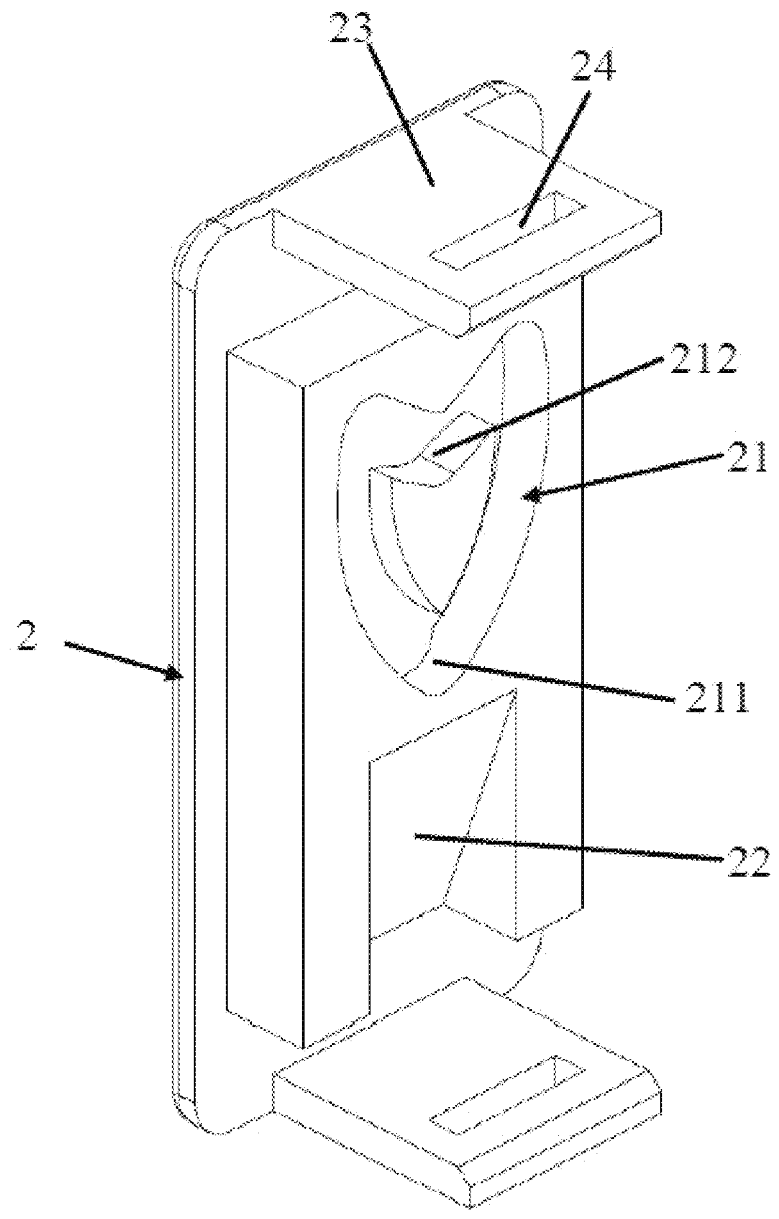
FIG. 4 is a perspective view of an end cap.
Figure 5:
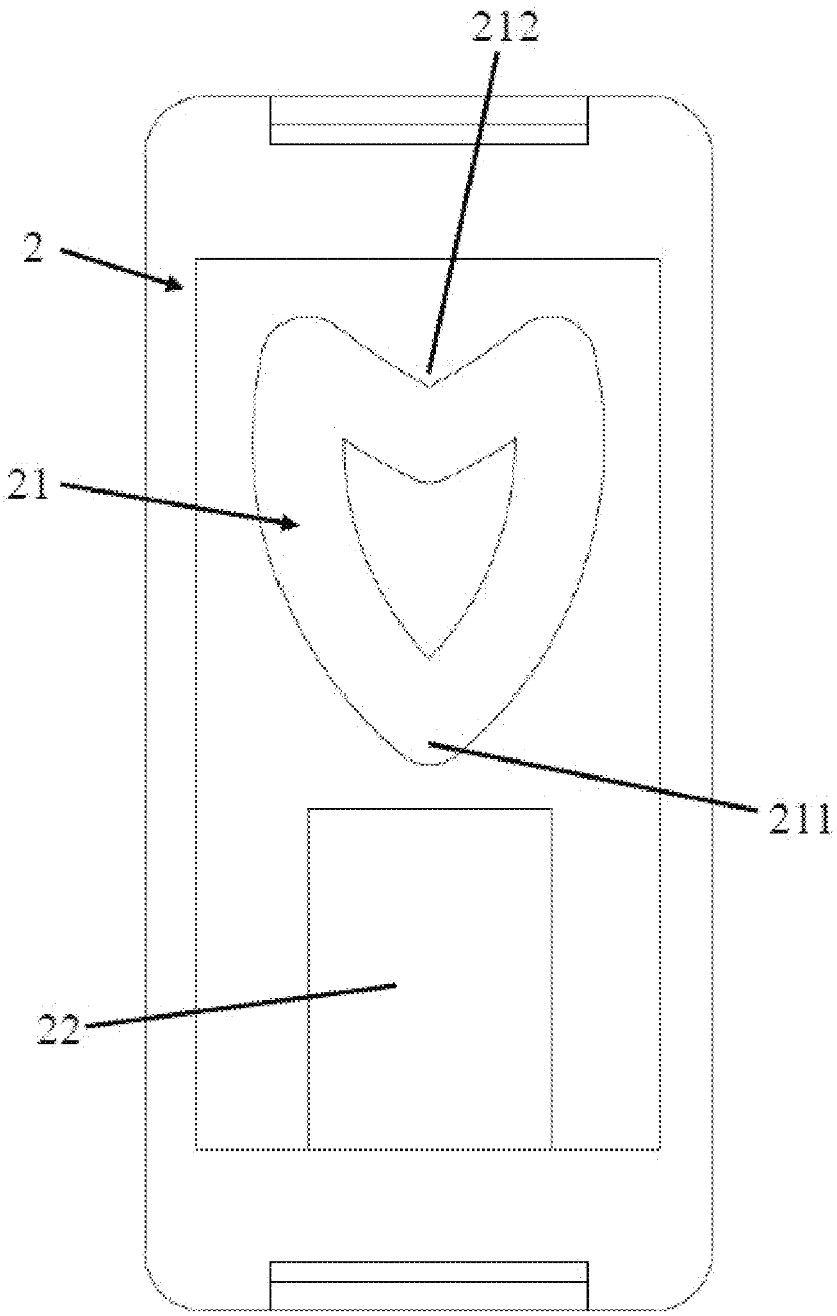
FIG. 5 is a front view of the end cap having a guide sliding chute and a guide ramp.
Figure 6:
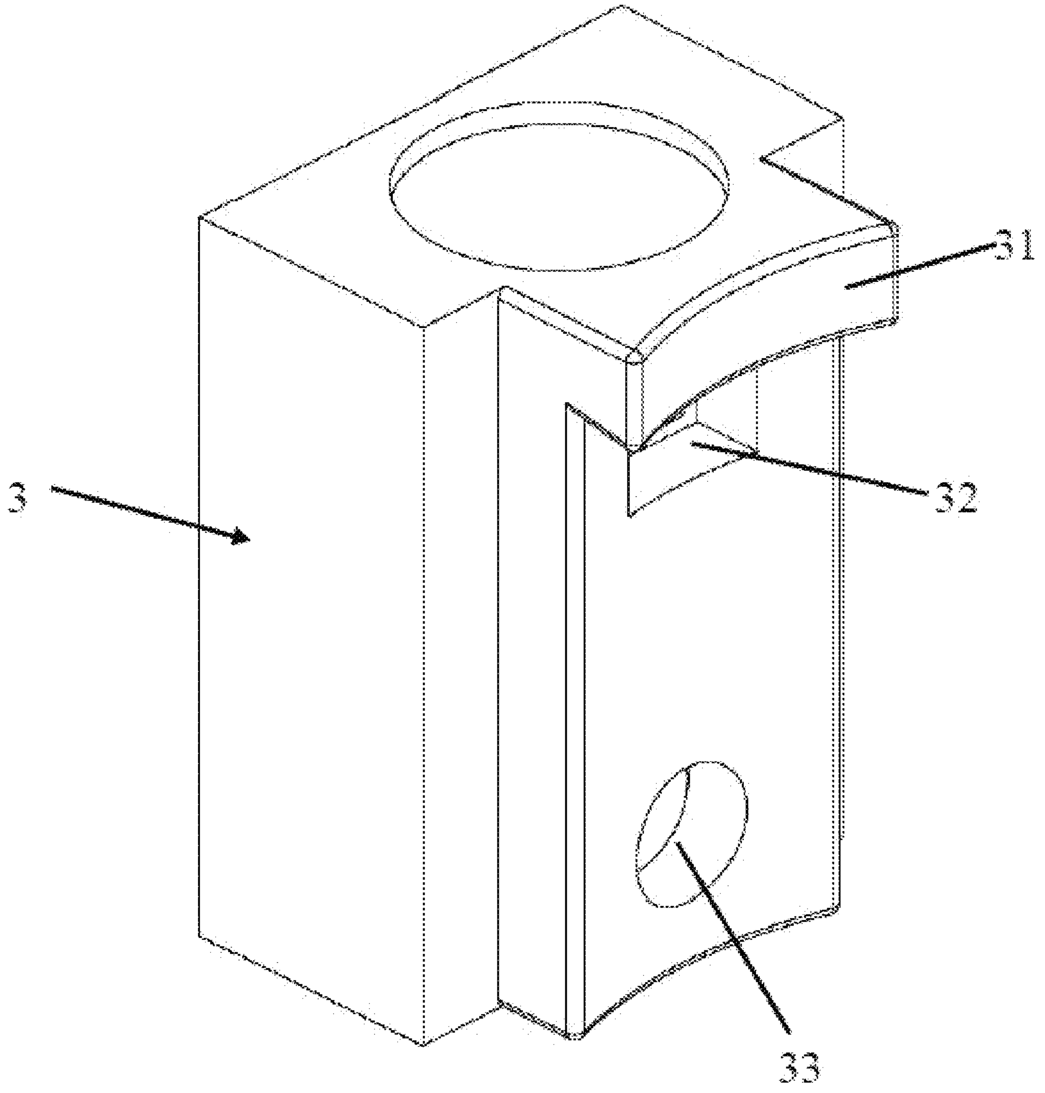
FIG. 6 is a perspective view of a slider.

FIG. 1 is an exploded view of an operation switch provided by an embodiment of the present disclosure. FIG. 2 is a sectional view of the operation switch with a sliding pin being located within a lower positioning recess. FIG. 3 is a sectional view of the operation switch with the sliding pin being located within an upper positioning recess. FIG. 4 is a perspective view of an end cap. FIG. 5 is a front view of the end cap having a guide sliding chute and a guide ramp. FIG. 6 is a perspective view of a slider.

As shown in FIG. 1 to FIG. 6, the operation switch provided by an embodiment of the present disclosure includes a housing 1 having a mounting cavity 11, an end cap 2 mounted on the housing 1, a slider 3 equipped in the mounting cavity 11 and movable upwardly and downwardly, a sliding pin 4 equipped between the end cap 2 and the slider 3, and a positioning pin 5 slidably connected with the slider 3.

The housing 1 has a housing opening 12 in communication with the mounting cavity 11 at the side of the housing 1 away from the end cap 2. The slider 3 has a slider stop plate 31 extending out from the housing opening 12.

A guide sliding chute 21 is provided on the end cap 2. The sliding pin 4 is in clearance fit with the guide sliding chute 21.

The guide sliding chute 21 has a lower positioning recess 211 and an upper positioning recess 212 for limiting the position of the sliding pin 4.

A guide ramp 22 is further provided on the end cap 2 below the guide sliding chute 21. One end of the positioning pin 5 slidably contacts or touches the guide ramp 22.

A first resilient member 50 is provided between the slider 3 and the positioning pin 5, for biasing the positioning pin 5 toward the end cap 2.

When the sliding pin 4 is located within the lower positioning recess 211, the positioning pin 5 is received within the mounting cavity 11. When the sliding pin 4 is located within the upper positioning recess 212, the positioning pin 5 extends at least partly out from the housing opening 12.

The operation switch provided by the present disclosure may be mounted on the sleeve of the faucet, for controlling the pulling and the temporal stopping of the hose or the cord.

The operation switch includes a housing 1, an end cap 2, a slider 3, a sliding pin 4 and a positioning pin 5. The housing 1 has a mounting cavity 11. The end cap 2 is mounted on a front opening of the housing 1. The housing 1 has a housing opening 12 (i.e., a rear opening) at the side of the housing 1 away from the end cap 2. The housing opening 12 is in communication with the mounting cavity 11.

A guide sliding chute 21 and a guide ramp 22 are provided on the side of the end cap 2 toward the mounting cavity 11. The guide sliding chute 21 is located above the guide ramp 22. The guide sliding chute 21 has a lower positioning recess 211 and an upper positioning recess 212. The guide ramp 22 gradually inclines toward the slider 3 along the direction from the bottom to the top.

The slider 3 is equipped within the mounting cavity 11 and is slidable upwardly and downwardly in the mounting cavity 11. Specifically, the slider 3 may be guided by a guide rail. For example, vertically extending rails are provided on the cavity walls of the mounting cavity 11, vertically extending sliding chutes are formed on the slider 3, and the rails are in clearance fit or engaged with the sliding chutes. Alternatively, vertically extending rails may be provided on the slider 3, vertically extending guide chutes are formed on the cavity walls of the mounting cavity 11, and the rails are in clearance fit with the guide chutes.

A slider stop plate 31 is provided on the slider 3 and extends out from the housing opening 12. The slider stop plate 31 may be lifted up by the guide sleeve 7 in the sleeve 6 (shown in FIG. 7), such that the slider 3 is driven to rise.

The sliding pin 4 is equipped between the slider 3 and the end cap 2. One end of the sliding pin 4 is inserted into the guide sliding chute 21. The sliding pin 4 is in clearance fit or engaged with the guide sliding chute 21. The sliding pin 4 is slidable along the guide sliding chute 21, so as to shift its position between the lower positioning recess 211 and the upper positioning recess 212. The other end of the sliding pin 4 is connected with the slider 3.

While the slider 3 rises or falls in the mounting cavity 11, the sliding pin 4 moves with the slider 3, such that the sliding pin 4 shifts its position along the guide sliding chute 21 between the lower positioning recess 211 and the upper positioning recess 212.

The positioning pin 5 is slidably connected with the slider 3 and is movable forwardly and backwardly relative to the slider 3 (movable along the left-right direction in FIG. 2 and FIG. 3).

The positioning pin 5 is located below the sliding pin 4. One end of the positioning pin 5 keeps a sliding contact with the guide ramp 22, and the other end is extendable out from the housing opening 12 to prevent the guide sleeve 7 from moving downwardly.

The first resilient member 50 is equipped between the slider 3 and the positioning pin 5 and is used for biasing the positioning pin 5 toward the end cap 2, such that the positioning pin 5 can retract to reach its initial position. The first resilient member 50 may be a spring or a resilient strip.

Figure 8:
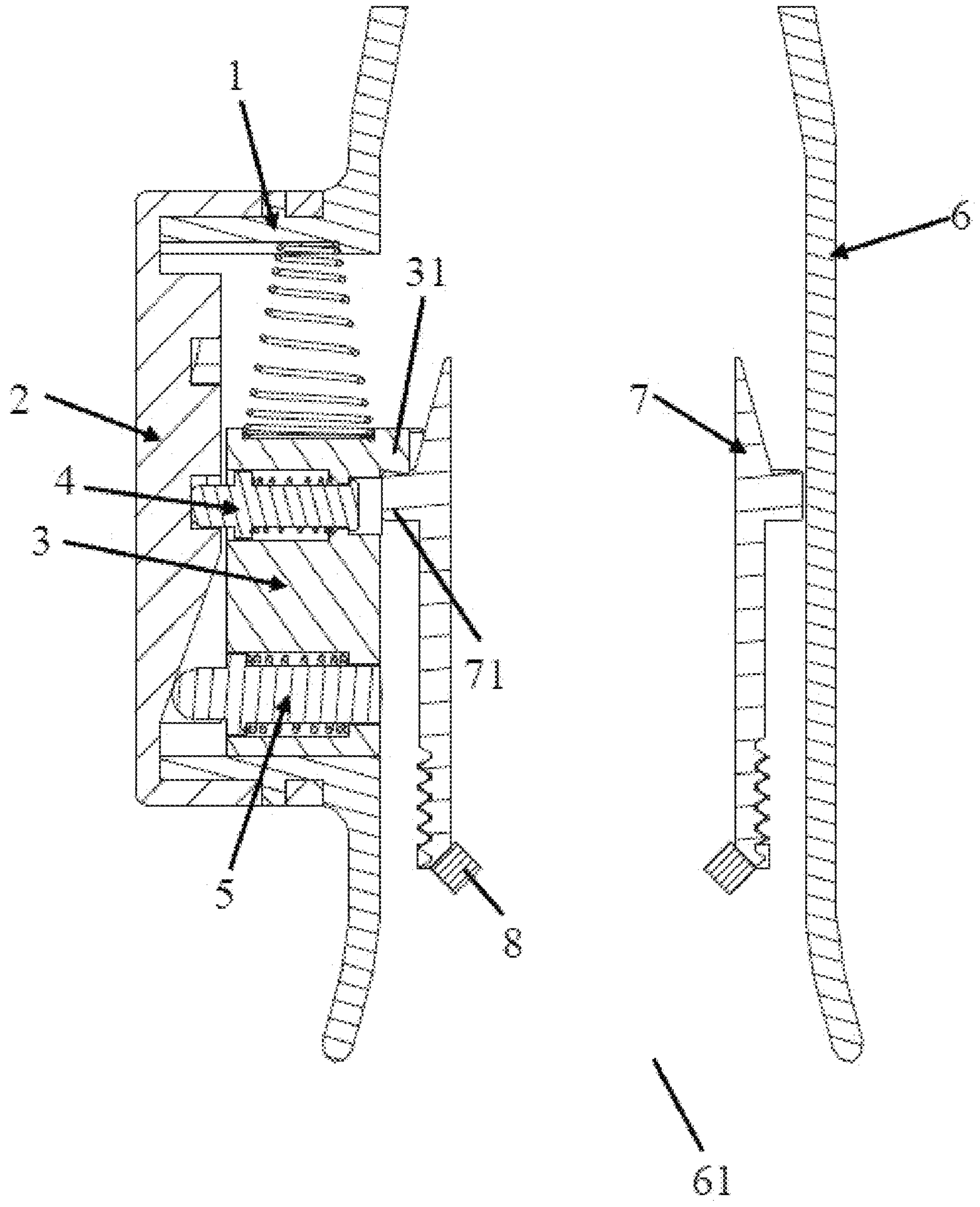
FIG. 8 is a sectional view of the operation mechanism with the sliding pin being located within the lower positioning recess.
Figure 9:
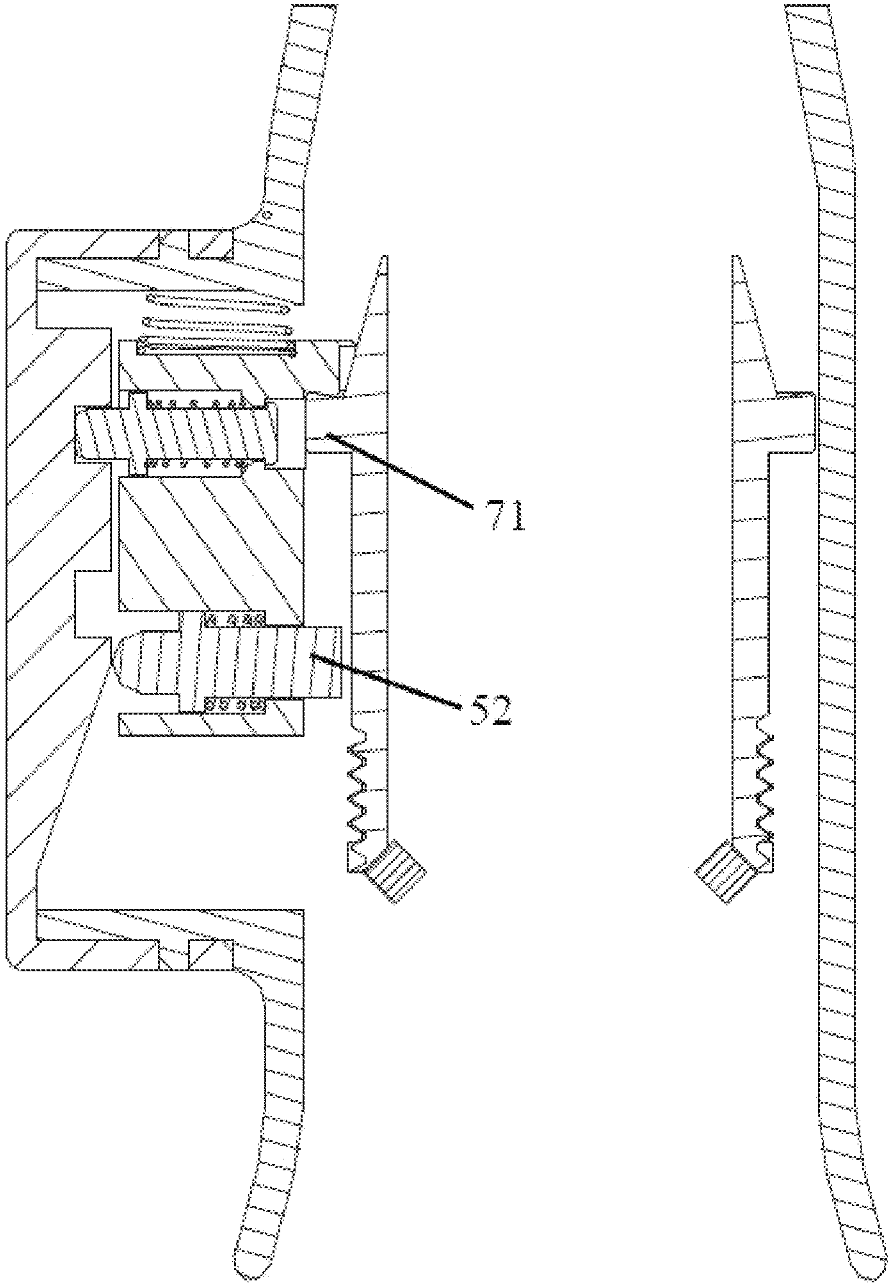
FIG. 9 is a sectional view of the operation mechanism with the sliding pin being located within the upper positioning recess.

As shown in FIG. 2 and FIG. 3 and by reference to FIG. 8 and FIG. 9, when the slider 3 is in an initial condition, the sliding pin 4 is located within the lower positioning recess 211, the end of the positioning pin 5 contacts or touches a lower portion of the guide ramp 22, and the positioning pin 5 as a whole is received within the mounting cavity 11. At this time, the guide sleeve 7 may enter the sleeve 6 via a bottom opening 61 of the sleeve 6.

The slider 3 may be driven by the guide sleeve 7 to move upwardly, and thus the sliding pin 4 is driven to be disengaged with the lower positioning recess 211 and slides upwardly along the guide sliding chute 21. The sliding pin 4 may slides up to the highest position of the guide sliding chute 21. When the external force applied on the slider 3 disappears, the sliding pin 4 will fall into the upper positioning recess 212. The sliding pin 4 is temporally positioned or limited, and the slider 3 is thus also temporally positioned or limited so as to be suspended at a higher position. At this time, one end of the positioning pin 5 contacts or touches a higher portion of the guide ramp 22. In the effect of the guide ramp 22, the positioning pin 5 moves toward the housing opening 12. The other end of the positioning pin 5 extends out from the housing opening 12 to prevent the guide sleeve 7 from falling down.

When it is desired to restore the positioning pin 5 to its initial position, the slider 3 is lifted up again by the guide sleeve 7, such that the sliding pin 4 is disengaged with the upper positioning recess 212 and moves downwardly along the guide sliding chute 21. During this process, the first resilient member 50 always biases the positioning pin 5 toward the guide ramp 22, and the end of the guide pin 5 always contacts or touches the guide ramp 22. When the sliding pin 4 slides into the lower positioning recess 211, the end of the positioning pin 5 contacts or touches a lower portion of the guide ramp 22, and the positioning pin 5 as a whole is received within the mounting cavity 11. The guide sleeve 7 can exit the sleeve 6 via the bottom opening 61 of the sleeve 6.

The operation switch provided by the present disclosure has a simple structure and is easy to mount and operate, with low cost and high practical applicability.

In one of the embodiments, as shown in FIG. 4 to FIG. 6, the guide sliding chute 21 is heart-shaped.

A slider hole 32 is provided on the slider 3. The sliding pin 4 passes through the slider hole 32 and is movable in the slider hole 32 along the width direction of the slider 3.

In the present disclosure, the direction from the end cap 2 to the slider 3 is the length direction or the thickness direction of the slider 3; the vertical direction is the height direction of the slider 3; and the direction from one half of the heart-shaped guide sliding chute 21 to the other half is the width direction of the slider 3.

The slider hole 32 is a rectangular hole, the width of which is greater than the height, and the length or depth of which is equal to the thickness of the slider 3.

The width of the slider hole 32 is substantially equal to the biggest distance between the left and right sides of the heart-shaped guide sliding chute 21. While the sliding pin 4 slides along the heart-shaped guide sliding chute 21, the sliding pin 4 moves laterally in the slider hole 32 as well. The lateral moving distance of the sliding pin 4 is accommodated by the slider hole 32 and thus no lateral movement of the slider 3 is needed. With such a configuration, the slider 3 only needs to be movable in the vertical direction. Thus, simplifying the mounting structure and the way of moving of the slider 3 is advantageous. Such a configuration makes it easy to mount the slider 3 and keep the slider 3 stable.

The sliding pin 4 may be in clearance fit or engaged with the slider hole 32 via a holding structure, such that the sliding pin 4 can only move along the width direction of the slider hole 32 and cannot move along the length direction or the front-rear direction of the slider hole 32. Thus, keeping the stability of the connection structure is advantageous.

In one of the embodiments, as shown in FIG. 1 to FIG. 3, a second resilient member 40 for biasing the sliding pin 4 toward the end cap 2 is equipped between the slider 3 and the sliding pin 4. The second resilient member 40 may be a spring or a resilient strip. The second resilient member 40 is equipped between the slider 3 and the sliding pin 4, for biasing the sliding pin 4 toward the end cap 2, such that the end of the sliding pin 4 is always kept within the guide sliding chute 21. Thus, the sliding pin 4 is prevented from separating from the guide sliding chute 21.

In one of the embodiments, as shown in FIG. 1 to FIG. 3, a third resilient member 30 for biasing the slider 3 downwardly is provided between the housing 1 and the slider 3. The third resilient member 30 may be a spring or a resilient strip. The third resilient member 30 is equipped between the top of the slider 3 and the housing 1, for biasing the slider 3 downwardly to return its initial position.

In one of the embodiments, as shown in FIG. 1 to FIG. 3, the positioning pin 5 includes a positioning pin mating end 51 and a positioning pin body 52, which are connected together.

Correspondingly, a slider through-hole 33 is provided on the slider 3. The positioning pin body 52 is in clearance fit or engaged with the slider through-hole 33. The positioning pin mating end 51 slidably contacts or touches the guide ramp 22.

The first resilient member 50 is provided between the positioning pin body 52 and the slider 3.

The positioning pin mating end 51 and the positioning pin body 52 are formed integrally as the positioning pin 5. The positioning pin mating end 51 faces toward the guide ramp 22 and keeps a sliding contact with the guide ramp 22. The positioning pin body 52 is inserted into the slider through-hole 33 and is in clearance fit or engaged with the slider through-hole 33, so as to be slidable relative to the slider through-hole 33. Thus, the end of the positioning pin body 52 can extend out from the housing opening 12.

One end of the first resilient member 50 is connected to the positioning pin body 52, and the other end is connected with the slider 3. The first resilient member 50 is used for biasing the positioning pin 5 toward the guide ramp 22 to return its initial position.

In one of the embodiments, as shown in FIG. 1 to FIG. 3, the surface of the positioning pin mating end 51 toward the guide ramp 22 is a curved surface. The end of the positioning pin mating end 51 toward the guide ramp 22 may be a part of a sphere, and its surface is a curved surface, such that the contact between the positioning pin mating end 51 and the guide ramp 22 is a point contact. Thus, the friction generated may be reduced while the two slides relative to each other.

In one of the embodiments, as shown in FIG. 1 to FIG. 4, the end cap 2 and the housing 1 are connected via snap fit, and thus a detachable connection between the end cap 2 and the housing 1 may be obtained.

Specifically, coupling grooves 13 are provided on the upper and lower sides of the housing 1, respectively. A tongue 14 is provided on the bottom of each coupling groove 13. The tongue 14 is a protrusion provided on the bottom of the coupling groove 13. Connection tabs 23 are provided on the upper and lower sides of the end cap 2, respectively. A clamping slot 24 is provided on each of the connection tabs 23. While assembling them, the two pieces of connection tabs 23 of the end cap 2 are inserted into the two coupling grooves 13 of the housing 1, respectively. The tongue 14 is correspondingly snapped into the clamping slot 24, so as to achieve a tighten connection between the end cap 2 and the housing 1.

Figure 7:
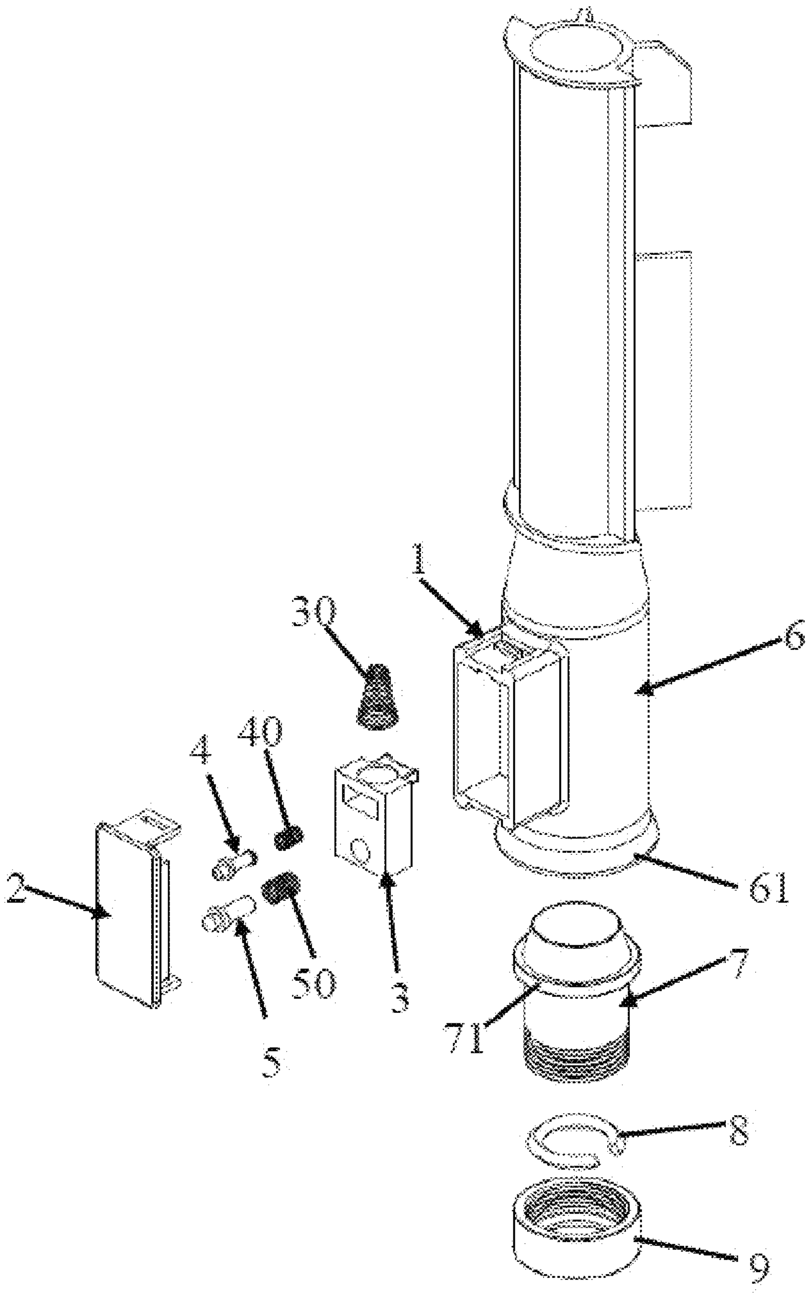
FIG. 7 is an exploded view of an operation mechanism provided by an embodiment of the present disclosure.
Figure 10:
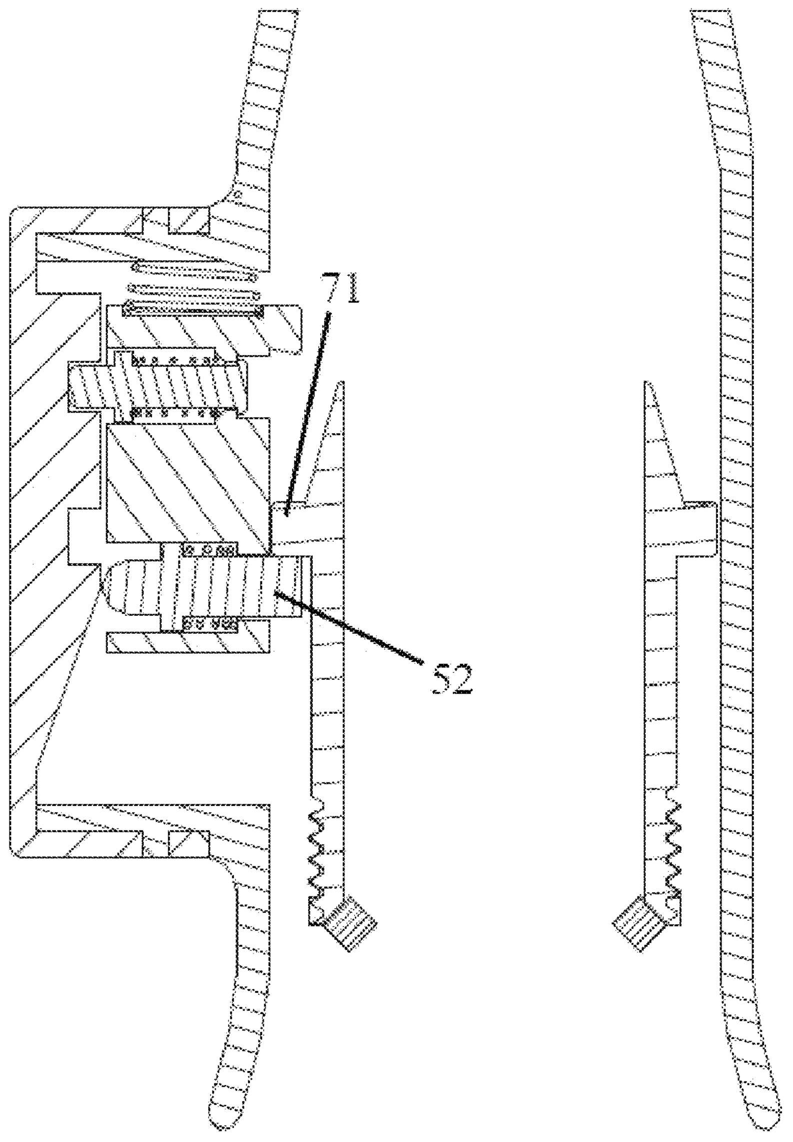
FIG. 10 is a sectional view of the operation mechanism with a flange of a guide sleeve being limited by the positioning pin.

FIG. 7 is an exploded view of an operation mechanism provided by an embodiment of the present disclosure. FIG. 8 is a sectional view of the operation mechanism with the sliding pin being located within the lower positioning recess. FIG. 9 is a sectional view of the operation mechanism with the sliding pin being located within the upper positioning recess. FIG. 10 is a sectional view of the operation mechanism with a flange of a guide sleeve being limited by the positioning pin.

As shown in FIG. 7 to FIG. 10, an operation mechanism provided by an embodiment of the present disclosure includes a sleeve 6, a guide sleeve 7 that can enter and exit the sleeve 6 via a bottom opening 61 of the sleeve 6, and an operation switch according to any of the preceding embodiments.

The housing 1 is mounted on the sleeve 6. The slider stop plate 31 is located within the sleeve 6.

A guide sleeve flange 71, which can lift up the slider stop plate 31, is provided on the guide sleeve 7.

While the sliding pin 4 is located within the upper positioning recess 212, the positioning pin 5 is at least partly located within the sleeve 6, and the guide sleeve flange 71 can be stopped by the positioning pin 5 and thus be prevented from falling down.

The operation mechanism provided by the present embodiment includes a sleeve 6, a guide sleeve 7 and an operation switch.

Regarding the structure, construction and operation principle of the operation switch, please refer to the preceding description about the operation switch, which is not repeated herein for the sake of brevity.

Figure 11:
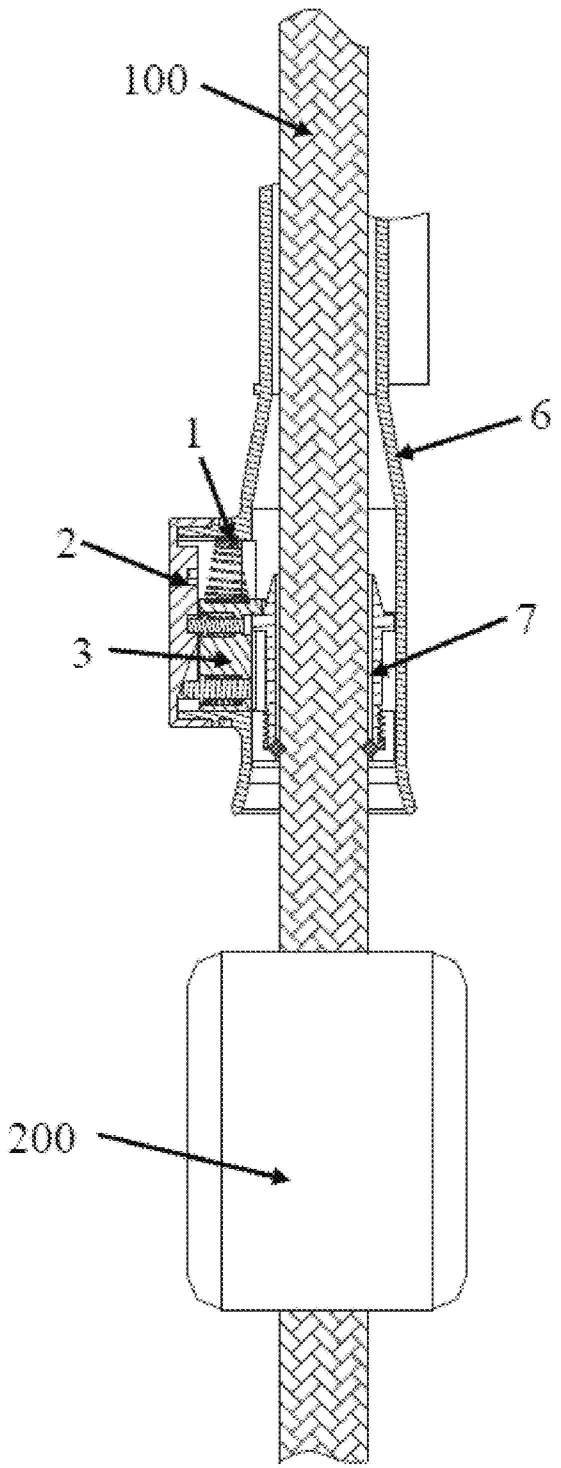
FIG. 11 is a sectional view of a pull-out device provided by an embodiment of the present disclosure.

The sleeve 6 is used for the hose/cord 100 as shown in FIG. 11 to pass therethrough, and the guide sleeve 7 is tightly secured around the hose/cord 100. The opening at the lower side of the sleeve 6 is a bottom opening 61. The guide sleeve 7 can enter into the sleeve 6 via the bottom opening 61 as the hose/cord 100 is pulled upwardly. The guide sleeve 7 can exit the sleeve 6 via the bottom opening 61 when the hose/cord 100 is unlocked by a further pulling.

A nut 9 is screwed at the bottom of the guide sleeve 7. The nut 9 tightly secures a clasp ring 8 at the bottom opening of the guide sleeve 7. The clasp ring 8 is used for clasping itself together with the hose/cord 100, so as to tightly secure the guide sleeve 7 around the hose/cord 100.

A guide sleeve flange 71 is provided on the outer surface of the guide sleeve 7. The guide sleeve flange 71 may be a circular or arc-shaped protrusion. On one hand, the guide sleeve flange 71 is used for lifting up the slider stop plate 31 when the guide sleeve flange 71 is moved upwardly, so as to drive the slider 3 to move upwardly. On the other hand, the guide sleeve flange 71 is used to contact or touches the positioning pin 5 when the guide sleeve flange 71 falls or is moved downwardly, and thus the guide sleeve flange 71 may be limited by the positioning pin 5, so as to prevent the guide sleeve 7 from falling down, such that the hose/cord 100 is in a suspended condition.

If the operation mechanism is applied to a faucet, after the hose is pulled out and in a suspended condition, the user does not need to apply further force to the hose. Thus, hands can be freed for other operations or work, which facilitates the using process.

In one of the embodiments, the housing 1 and the sleeve 6 are formed integrally, which facilitates processing and manufacturing and improves the structure strength thereof.

FIG. 11 is a sectional view of a pull-out device provided by an embodiment of the present disclosure. As shown in FIG. 11, a pull-out device provided by an embodiment of the present disclosure includes a hose/cord 100 and an operation mechanism according to any of the preceding embodiments.

The hose/cord 100 passes through the sleeve 6. The guide sleeve 7 is tightly secured around the hose/cord 100.

While the hose/cord 100 is in an initial condition, the guide sleeve 7 is located below the sleeve 6.

While the hose/cord 100 is in a condition of being pulled upwardly, the guide sleeve 7 is located within the sleeve 6 and the guide sleeve flange 71 contacts or touches the slider stop plate 31.

While the hose/cord 100 is in a suspended condition, the guide sleeve 7 is located within the sleeve 6 and the guide sleeve flange 71 contacts or touches the positioning pin 5.

The pull-out operation device provided by the present embodiment includes a hose/cord 100 and an operation mechanism.

Regarding the structure, construction and operation principle of the operation mechanism, please refer to the preceding description about the operation mechanism, which is not repeated herein for sake of brevity.

A movement weight mass 200 is provided on the hose/cord 100 and is located below the sleeve 6.

When the hose/cord 100 is in an initial condition, the guide sleeve 7 is located below the sleeve 6, the sliding pin 4 is located within the lower positioning recess 211, the end of the positioning pin 5 contacts or touches a lower portion of the guide ramp 22, and the positioning pin 5 as a whole is received within the mounting cavity 11.

When the hose/cord 100 is pulled upwardly for the first time, the guide sleeve 7 enters into the sleeve 6 via the bottom opening 61 and the guide sleeve flange 71 contacts or touches the slider stop plate 31 and lifts up the slider stop plate 31 to make it move upwardly, such that the slider 3 is driven to move upwardly in the mounting cavity 11. The sliding pin 4 is in turn disengaged with the lower positioning recess 211 and moves upwardly along the guide sliding chute 21 to the highest position.

When the hose/cord 100 is pulled out by the user to a desired length, the hose/cord 100 is released for the first time, and the sliding pin 4 enters into the upper positioning recess 212. At this time, the sliding pin 4 is temporally positioned or limited, the slider 3 is thus also temporally positioned or limited so as to be suspended at a higher position, and one end of the positioning pin 5 contacts or touches a higher portion of the guide ramp 22. In the effect of the guide ramp 22, the positioning pin 5 overcomes the action force applied by the first resilient member 50 and moves toward the housing opening 12, and the other end of the positioning pin 5 extends out from the housing opening 12. While being released, in the effect of the movement weight mass 200, the hose/cord 100 and the guide sleeve 7 fall down. The guide sleeve flange 71 falls on the end of the positioning pin 5 and is thus blocked by the positioning pin 5, such that the guide sleeve 7 is prevented from falling down and the hose/cord 100 is in a suspended condition.

When the hose/cord 100 is needed to return back to its initial position, the user pulls the hose/cord 100 for the second time. The slider stop plate 31 is lifted up again by the guide sleeve flange 71. The slider 3 moves upwardly again for a certain distance and the sliding pin 4 also moves upwardly for a certain distance and is disengaged with the upper positioning recess 212 and then slides downwardly along the guide sliding chute 21. During this process, the first resilient member 50 always biases the positioning pin 5 toward the guide ramp 22, and thus the end of the positioning pin 5 always contacts or touches the guide ramp 22. When the sliding pin 4 slides into the lower positioning recesses 211, the end of the positioning pin 5 contacts or touches a lower portion of the guide ramp 22, and the positioning pin 5 as a whole is received within the mounting cavity 11. At this time, the user releases the hose/cord 100 for the second time, and the positioning pin 5 no longer prevents the falling of the guide sleeve 7, which can exit the sleeve 6 via the bottom opening 61 of the sleeve 6. The hose/cord 100 can fall down to return its initial position.

The above technical solutions may be combined according to requirements so as to achieve the best technical effect.

In sum, the present disclosure discloses an operation switch, an operation mechanism, and a pull-out device including a housing, an end cap, a slider, a sliding pin and a positioning pin. The housing has a housing opening on one side of the housing away from the end cap. The slider has a slider stop plate extending out from the housing opening. The end cap has a guide sliding chute. The sliding pin is in clearance fit with the guide sliding chute. The guide sliding chute has a lower positioning recess and an upper positioning recess. The end cap has a guide ramp below the guide sliding chute, and an end of the positioning pin slidably contacts or touches the guide ramp. A first resilient member is provided between the slider and the positioning pin, for biasing the positioning pin toward the end cap. The operation switch, the operation mechanism and the pull-out device provided by the present disclosure have simple structures, are easy to mount and operate, with low cost and high practical applicability.

The above described are only the principle and embodiments of the present disclosure. It should be noted that, for those having ordinary skill in the art, several other variations may be made on the basis of the principle of the present disclosure. These variations should also be considered as falling into the protection scope of the present disclosure.

Second Embodiments: Pull-Out Control Mechanism and Pull-Out Device

The detailed embodiments of the present disclosure will be further described by reference to the accompanying drawings hereinafter. Like reference numerals refer to like elements. It should be noted that the terms of "front", "back", "left", "right", "up", and "down" used in the following description refer to the directions in the accompanying drawings, and the terms of "inner" and "outer" refer to the directions towards or away from the geometric center of a specific component, respectively.

Figure 12:
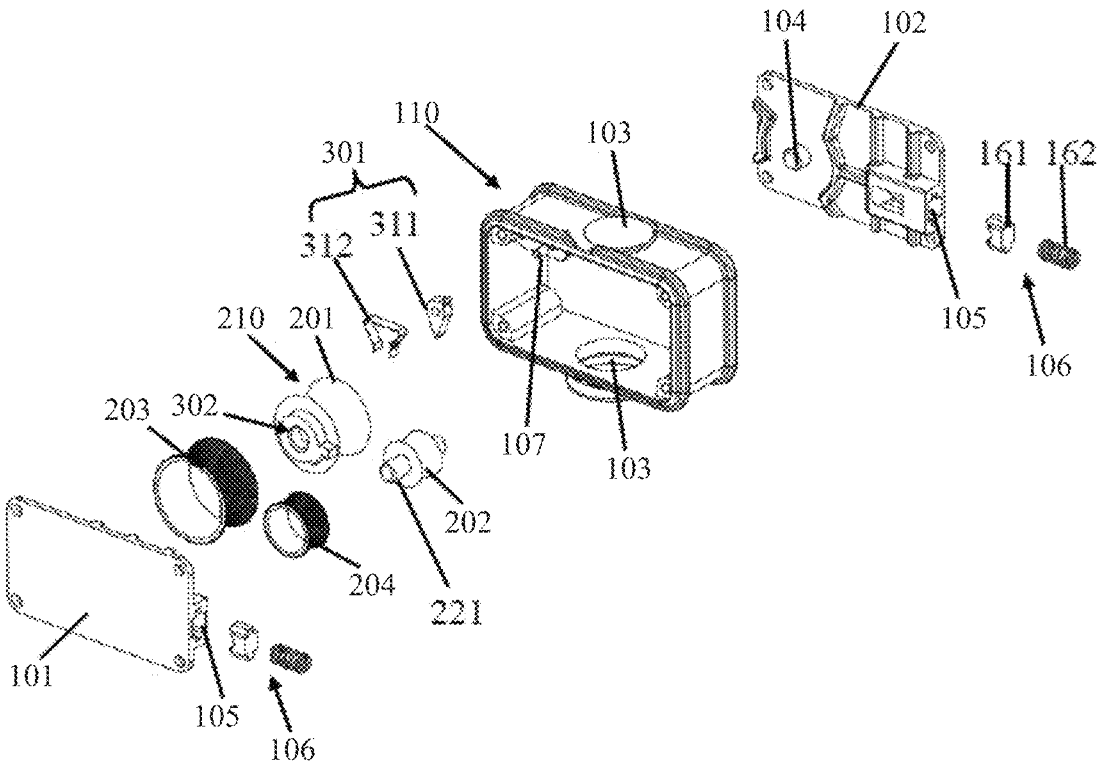
FIG. 12 is an exploded view of a pull-out control mechanism provided by an embodiment of the present disclosure.
Figure 13:
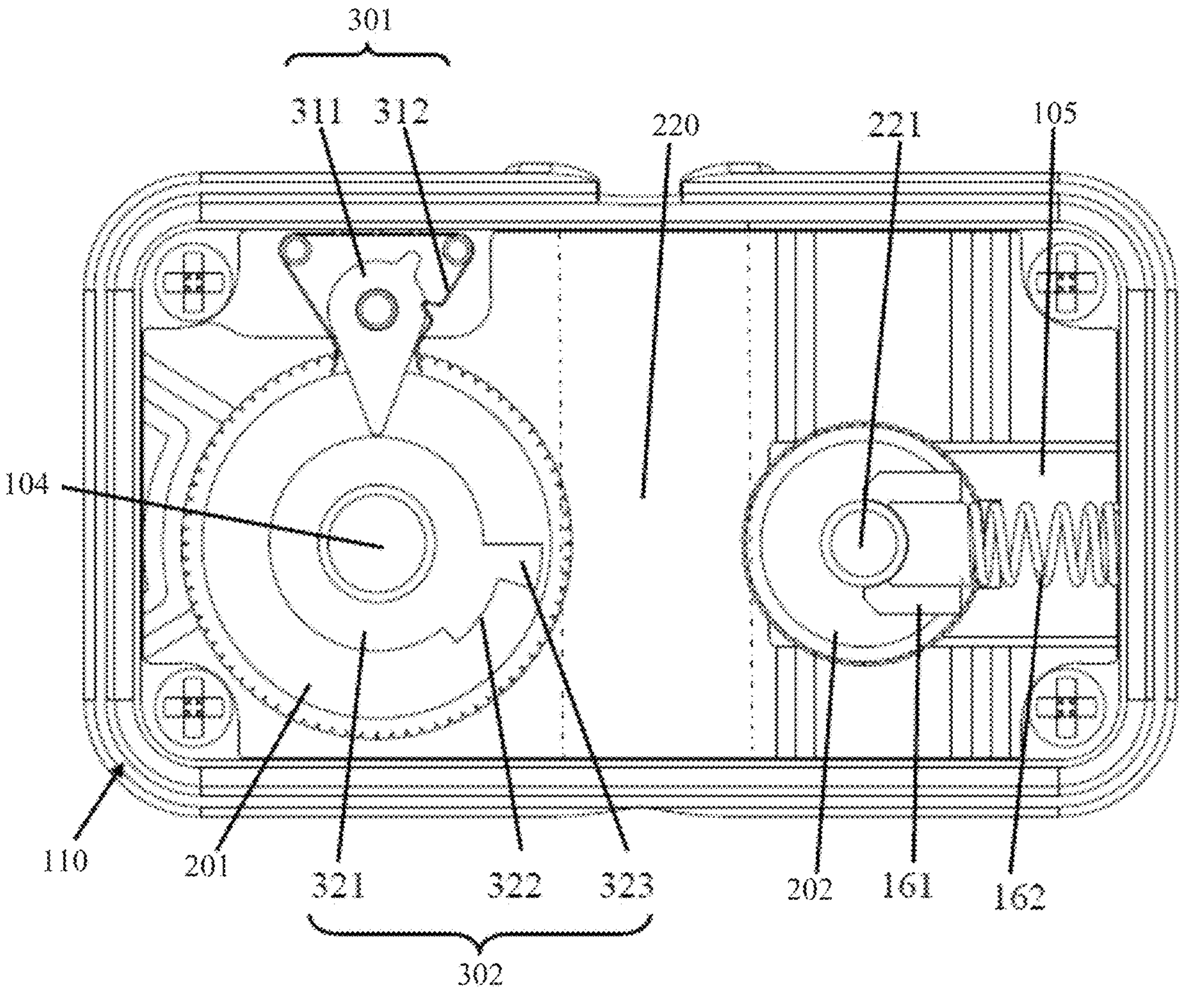
FIG. 13 is a schematic view of installation of the pull-out control mechanism provided by an embodiment of the present disclosure.
Figure 14:
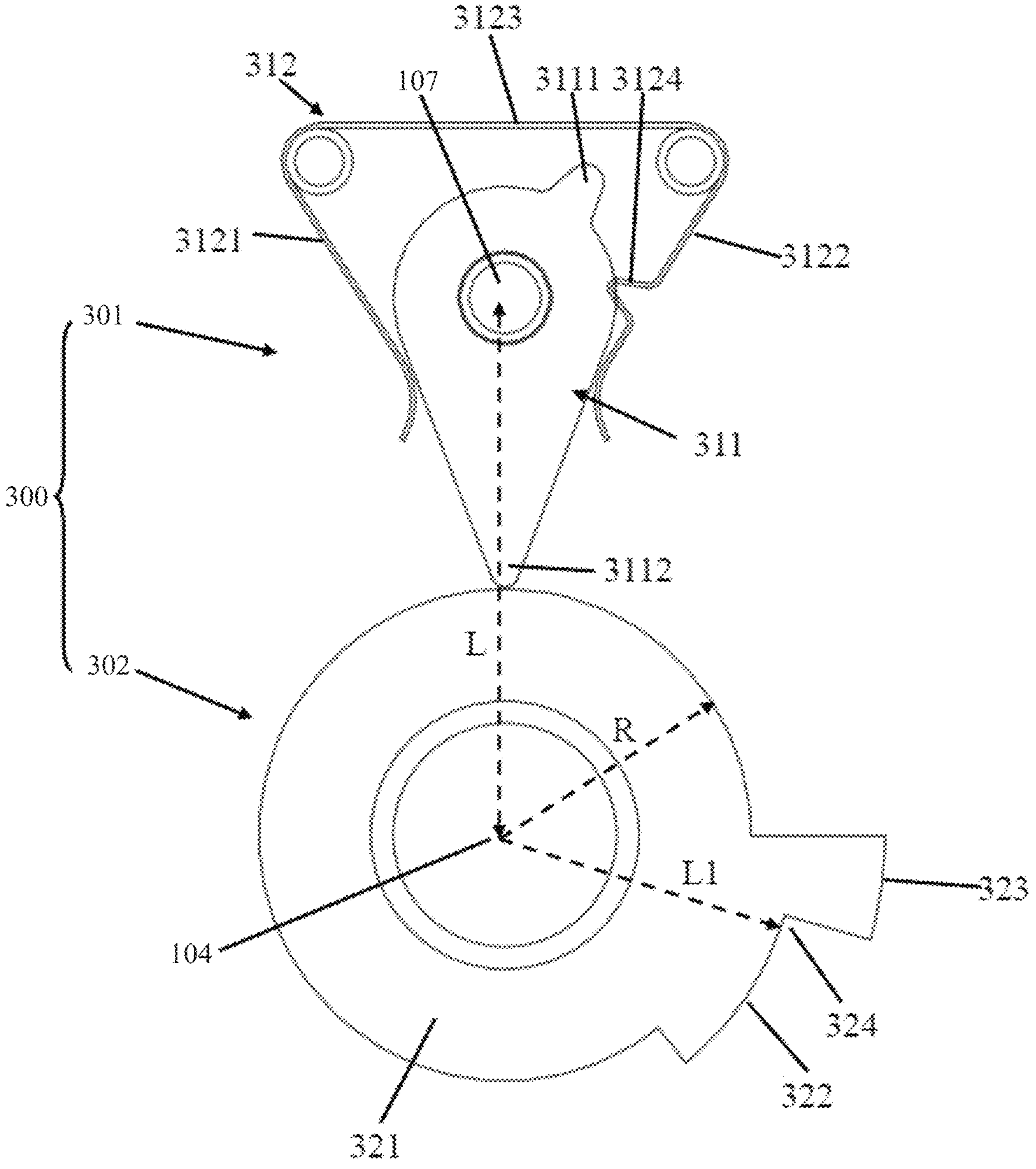
FIG. 14 is a schematic structural view of a locking and releasing mechanism.
Figure 18:
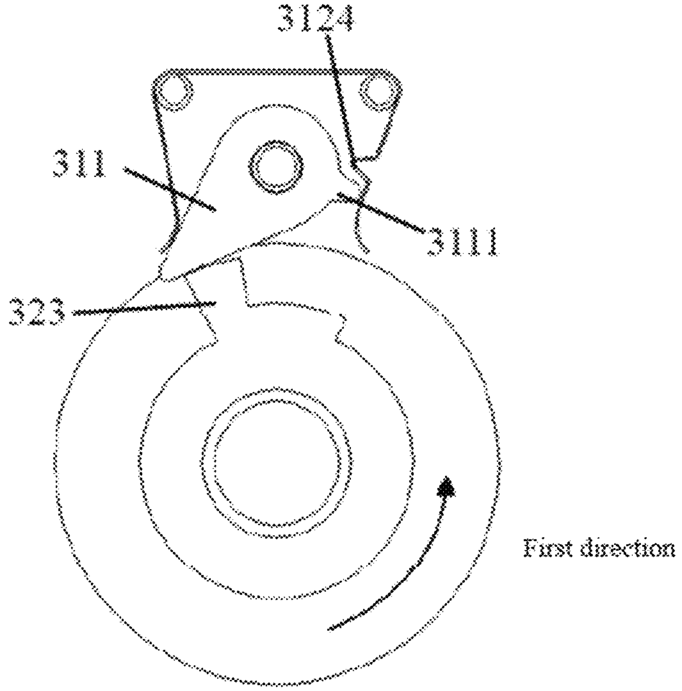
FIG. 18 is a schematic view that shows the first rotating wheel rotating in a first direction for the first time.
Figure 19:
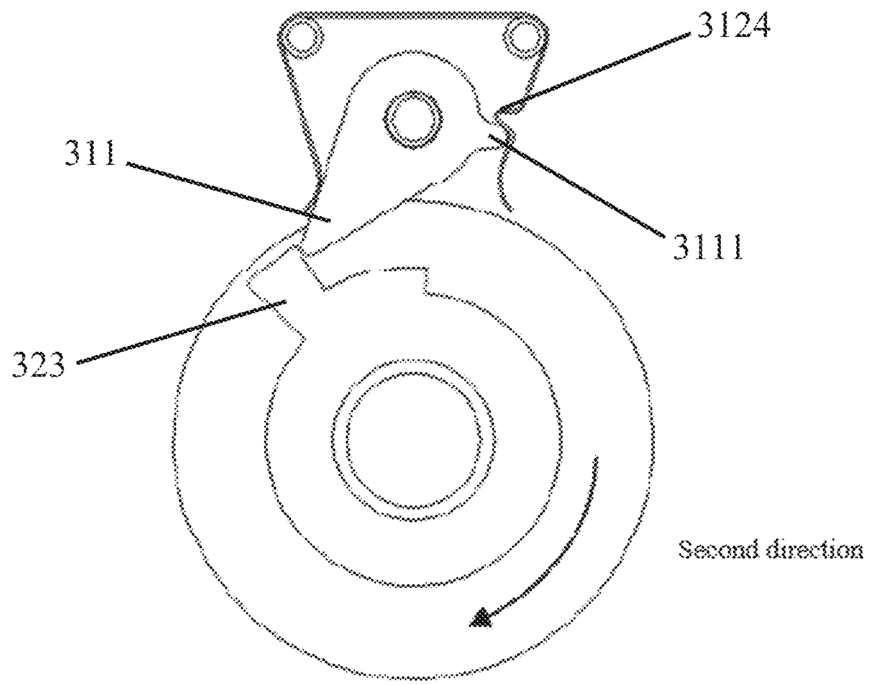
FIG. 19 is a schematic view that shows the first rotating wheel rotating in a second direction for the first time.
Figure 20:
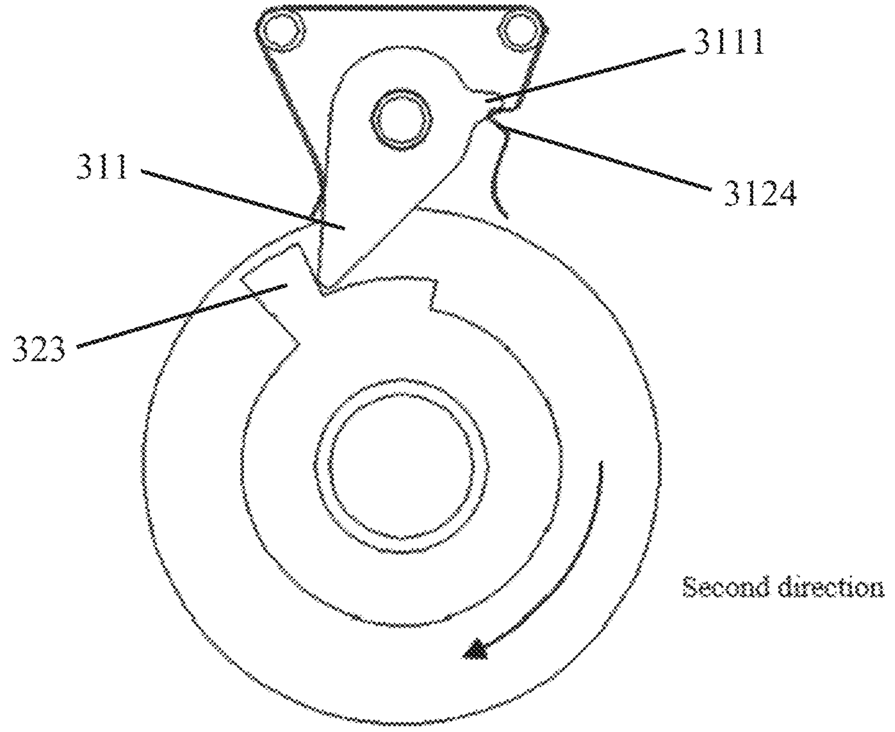
FIG. 20 is a schematic view showing that the swing member and the rotation locking member are in a locked status after the first rotating wheel rotates in the first direction for the first time.
Figure 21:
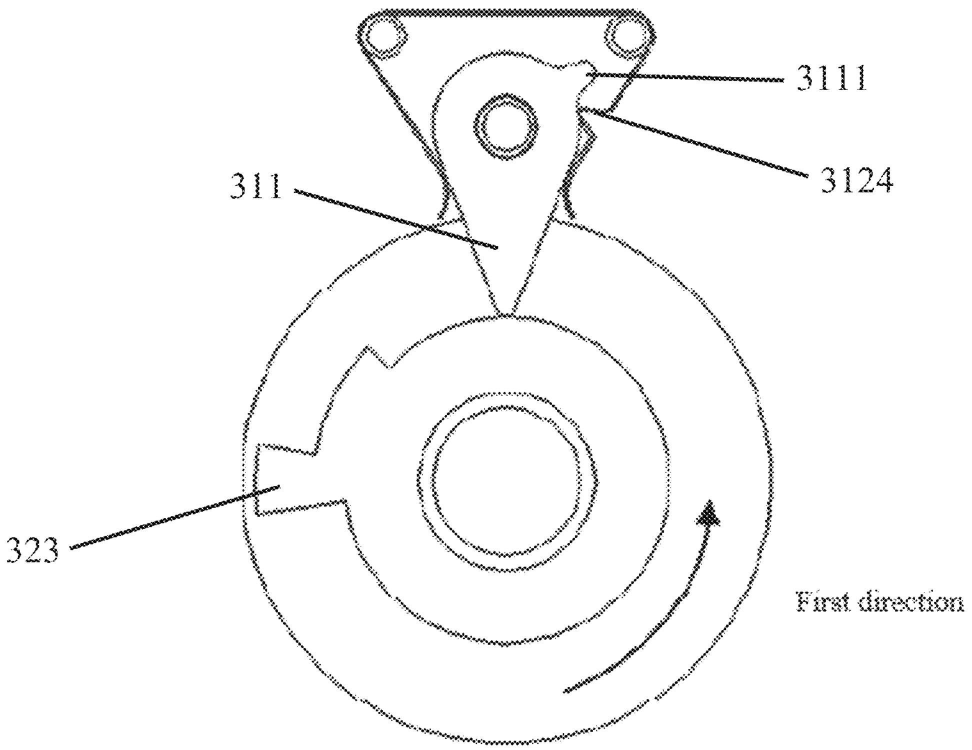
FIG. 21 is a schematic view showing that the swing member is in a free swinging status after the first rotating wheel rotates in the first direction again.
Figure 22:
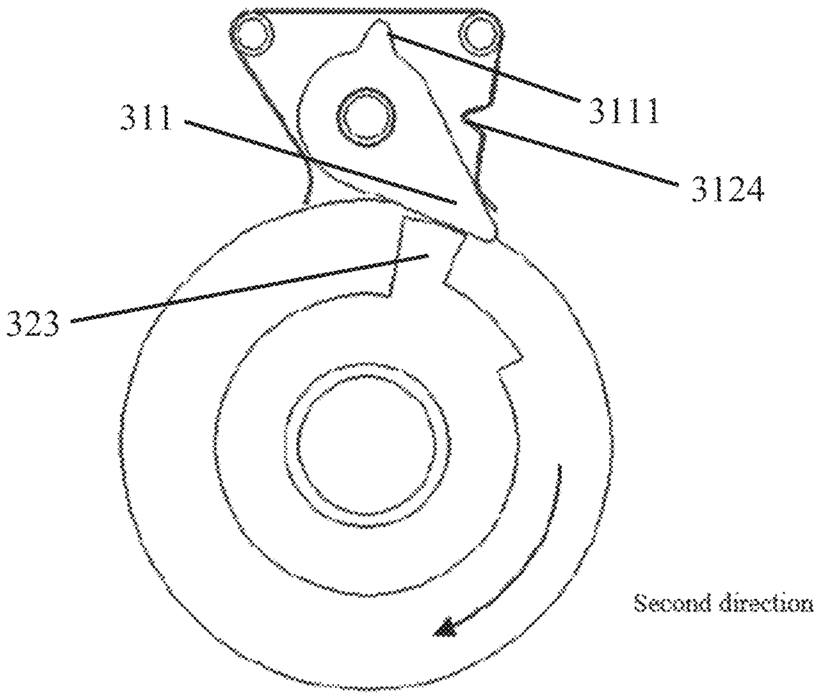
FIG. 22 is a schematic view showing that an actuating member is capable of passing over the swing member after the first rotating wheel rotates in the second direction again.

FIG. 12 is an exploded view of a pull-out control mechanism provided by an embodiment of the present disclosure. FIG. 13 is a schematic view of installation of the pull-out control mechanism provided by an embodiment of the present disclosure. FIG. 14 is a schematic structural view of a locking and releasing mechanism. FIG. 18 is a schematic view that shows the first rotating wheel rotating in a first direction for the first time. FIG. 19 is a schematic view that shows the first rotating wheel rotating in a second direction for the first time. FIG. 20 is a schematic view showing that the swing member and the rotation locking member are in a locked status after the first rotating wheel rotates in the first direction for the first time. FIG. 21 is a schematic view showing that the swing member is in a free swinging status after the first rotating wheel rotates in the first direction again. FIG. 22 is a schematic view showing that an actuating member is capable of passing over the swing member after the first rotating wheel rotates in the second direction again. As shown in FIG. 12 to FIG. 14 and FIG. 18 to FIG. 22, a pull-out control mechanism provided by an embodiment of the present disclosure includes a housing 110, a hose/cord clamping wheel set 210, and a locking and releasing mechanism 300.

The hose/cord clamping wheel set 210 includes a first rotating wheel 201 and a second rotating wheel 202, which are mounted in the housing 110.

The locking and releasing mechanism 300 includes a swing locking member 301 mounted on the housing 110 and a rotation locking member 302 mounted on the first rotating wheel 201.

The swing locking member 301 includes a swing member 311 capable of swinging in the housing 110. The rotation locking member 302 includes an actuating member 323 capable of actuating the swing member 311.

When the first rotating wheel 201 rotates in a first direction for the first time, the actuating member 323 is capable of actuating the swing member 311 in the first direction and passing over the swing member 311.

When the first rotating wheel 201 rotates in a second direction opposite to the first direction for the first time, the actuating member 323 is capable of actuating the swing member 311 in the second direction, and the swing member 311 is locked together with the rotation locking member 302.

When the first rotating wheel 201 rotates in the first direction again, the swing member 311 is disengaged with the rotation locking member 302, and the swing member 311 is in a free swinging status.

When the first rotating wheel 201 rotates in the second direction again, the actuating member 323 is capable of passing over the swing member 311 that is in the free swinging status.

The pull-out control mechanism provided by the present disclosure is mainly used to control a pull-out operation of a hose or a cord and may be used in a pull-out faucet.

The pull-out control mechanism provided by the present disclosure includes the housing 110, the hose/cord clamping wheel set 210 and the locking and releasing mechanism 300.

The housing 110 includes a front cover 101 and a rear cover 102, and a mounting cavity is formed between the front cover 101 and the rear cover 102, for mounting the hose/cord clamping wheel set 210 and the locking and releasing mechanism 300.

The hose/cord clamping wheel set 210 includes the first rotating wheel 201 and the second rotating wheel 202, and the first rotating wheel 201 and the second rotating wheel 202 are respectively mounted in the mounting cavity of the housing 110. The center shaft of the first rotating wheel 201 is parallel to the center shaft of the second rotating wheel 202, and a certain distance is left between the first rotating wheel 201 and the second rotating wheel 202, thereby forming a passage 220 for the hose/cord 400 to pass therethrough between the first rotating wheel 201 and the second rotating wheel 202. The hose/cord 400 may be clamped by the first rotating wheel 201 and the second rotating wheel 202, and when the hose/cord 400 is pulled out or returned back to its original position, the hose/cord 400 is capable of rotating the first rotating wheel 201 and the second rotating wheel 202 by friction.

The locking and releasing mechanism 300 is used for locking and releasing the first rotating wheel 201. When the first rotating wheel 201 is released, the first rotating wheel 201 can rotate, and the hose/cord 400 may be pulled out or returned back to its original position. When the first rotating wheel 201 is locked, the first rotating wheel 201 cannot rotate, and the hose/cord 400 is clamped and positioned/limited in place by the first rotating wheel 201 and the second rotating wheel 202, and thus stays at a desired position without having to apply an external force to the hose/cord 400.

The locking and releasing mechanism 300 includes the swing locking member 301 and the rotation locking member 302. The swing locking member 301 is mounted in the housing 110, which is located beside one side of the first rotating wheel 201 and spaced apart from the first rotating wheel 201 by a preset distance. The rotation locking member 302 is mounted at one end of the first rotating wheel 201 and is capable of rotating integrally with the first rotating wheel 201. When the rotation locking member 302 is locked, the first rotating wheel 201 cannot rotate.

The swing locking member 301 includes the swing member 311. A pivot shaft 107 is mounted in the housing 110. The swing member 311 is sleeved on the pivot shaft 107 and is capable of swinging around the pivot shaft 107 in the housing 110. The swing member 311 is located beside one side of the first rotating wheel 201.

The rotation locking member 302 includes the actuating member 323, the length of the actuating member 323 is greater than the radius of the first rotating wheel 201, and an end portion of the actuating member extends outside the circumferential surface of the first rotating wheel 201, so that the actuating member is capable of actuating the swing member 311 along with the rotation of the first rotating wheel 201. Accordingly, the swing member 311 may swing so as to be locked together with the rotation locking member 302 or disengaged with the rotating locking member 302.

In the present disclosure, a single operation circle of the hose/cord 400 may go through the processes of pulling out, suspending and returning back to its original position.

During the single operation circle of the hose/cord 400, the operation status or mode of the locking and releasing mechanism 300 and the hose/cord clamping wheel set 210 is as follows.

As shown in FIG. 18, when the hose/cord 400 is pulled outwardly or upwardly for the first time, under the driving of the hose/cord 400, the first rotating wheel 201 rotates in the first direction (the counterclockwise direction in FIG. 18) for the first time, and the actuating member 323 is capable of actuating the swing member 311 in the first direction and passing over the swing member 311. In this status, the first rotating wheel 201 is capable of rotating in the first direction by any angle or any number of turns, and the hose/cord 400 can be pulled out.

After the hose/cord 400 is pulled out to a desired length, it is necessary to temporarily position the hose/cord 400 in place, so that the hose/cord 400 is suspended to avoid being drawn back by a weighting block attached below, and the following operations are employed.

After the hose/cord 400 is pulled out to the desired length, the hose/cord 400 is released, and no external force is applied to pull the hose/cord 400 again. When the hose/cord 400 is released for the first time, the hose/cord 400 moves downwardly under the action of the weighting block 500 shown in FIG. 23 and drives the first rotating wheel 201 to rotate in the second direction (the clockwise direction in FIG. 19) for the first time. Accordingly, the actuating member 323 actuates the swing member 311 in the second direction (that is, to actuate the swing member 311 backwards). As shown in FIG. 20, under the action of the actuating member 323, the end portion 3112 of the swing member 311 is locked together with a locking groove or a locking mechanism on the rotation locking member 302. At the moment, the first rotating wheel 201 cannot rotate, and the hose/cord 400 is clamped and positioned/limited by the hose/cord clamping wheel set 210, so that the hose/cord 400 does not need to be drawn by hand and the hose/cord 400 is located in a designated position, which is convenient for a user to use.

When the user needs to restore the hose/cord 400 back to its original position, the following operations are employed.

As shown in FIG. 21, when the hose/cord 400 is pulled outwardly or upwardly again or for the second time, the first rotating wheel 201 rotates in the first direction again or for the second time under the driving of the hose/cord 400, and the end portion 3112 of the swing member 311 is disengaged with the locking groove 324 of the rotation locking member 302 to realize unlocking. At the moment, the swing member 311 is in a free swinging status. When the swing member 311 is in the free swinging status, the actuating member 323 is capable of passing over the swing member 311 that is in the free swinging status regardless of whether the first rotating wheel 201 rotates in the first direction or in the second direction, and the swing member 311 will not be locked or stopped by the rotation locking member 302.

As shown in FIG. 22, after the swing member 311 is disengaged with the rotation locking member 302, the user releases the hose/cord 400 again, the first rotating wheel 201 rotates in the second direction again or for the second time, and the actuating member 323 may pass over the swing member 311 that is in the free swinging status. The first rotating wheel 201 may rotate in the second direction by any angle or any number of turns, and thus the hose/cord 400 is restored back to its original position under the driving of the weighting block 500.

Therefore, the pull-out control mechanism provided by the present disclosure can realize suspending and positioning of the hose/cord without having to draw the hose/cord by an external force, which is thus easy and convenient to operate and has high practicability.

Figure 16:
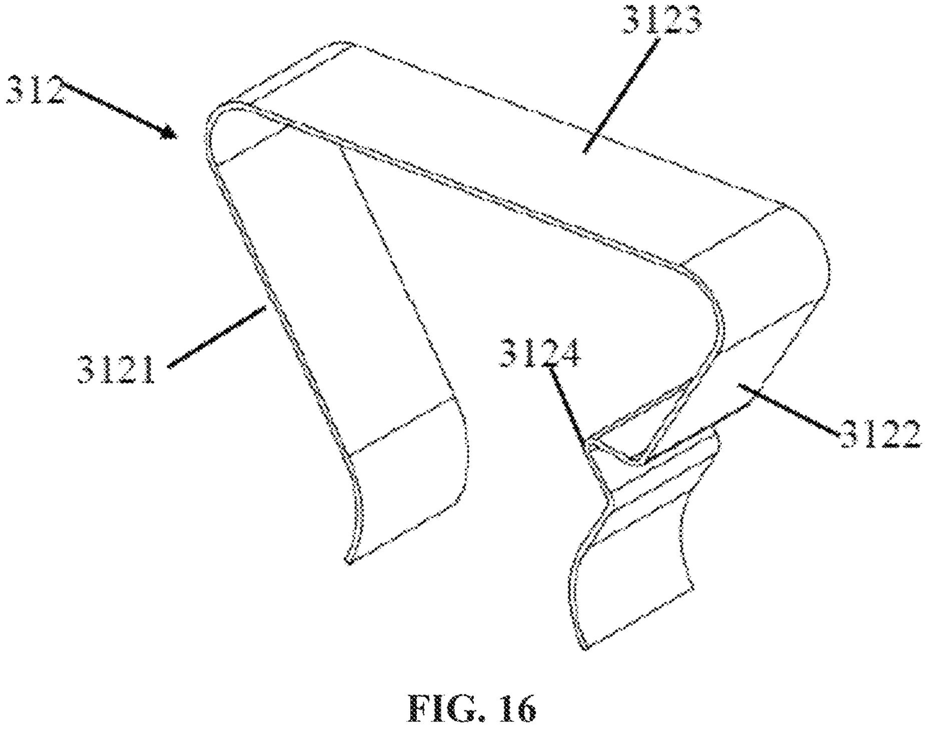
FIG. 16 is a perspective view of a resilient member.

FIG. 16 is a perspective view of a resilient member. In one of the embodiments, as shown in FIG. 12 to FIG. 14 and FIG. 16, the swing locking member 301 further includes an elastic member 312 mounted in the housing 110, for biasing the swing member 311.

In the embodiment, the elastic member 312 is arranged to apply a pressure to the swing member 311, so that the swing member 311 is capable of returning to a position where it is in a free status.

In one of the embodiments, as shown in FIG. 12 to FIG. 14 and FIG. 16, the clastic member 312 includes a first elastic strip 3121 and a second elastic strip 3122, which are spaced apart.

The pivot shaft 107 of the swing member 312 is located between the first elastic strip 3121 and the second elastic strip 3122.

The end portion 3112 of the swing member 311 extends out from an opening between the first elastic strip 3121 and the second elastic strip 3122, and the swing member 311 is also provided with a swing member bulge 3111 located between the first elastic strip 3121 and the second elastic strip 3122.

An clastic member bulge 3124 is arranged on the side of the second elastic strip 3122 facing the swing member 311.

The swing member bulge 3111 is capable of passing over the elastic member bulge 3124 and is capable of being limited by the elastic member bulge 3124.

In the embodiment, the clastic member 312 is substantially U-shaped, and includes the first elastic strip 3121, the second elastic strip 3122 and a connecting strip 3123. The first clastic strip 3121 and the second elastic strip 3122 are spaced apart, and the second elastic strip 3122 is located on the side close to the second rotating wheel 202. The connecting strip 3123 is connected between the first elastic strip 3121 and the second elastic strip 3122. The connecting strip 3213 is mounted on the housing 110 through positioning pins.

The pivot shaft 107 is located in the space surrounded by the first elastic strip 3121, the second elastic strip 3122 and the connecting strip 3123. The first elastic strip 3121 and the second elastic strip 3122 both extend towards the first rotating wheel 201, and the opening formed between the first elastic strip 3121 and the second elastic strip 3122 faces the first rotating wheel 201.

A main body portion of the swing member 311 is sleeved on the pivot shaft 107, and the end portion 3112 of the swing member 311 extends out from the opening between the first elastic strip 3121 and the second elastic strip 3122, so that the swing member is capable of being actuated due to the contact with the actuating member 323, and is also capable of being locked and stopped in coordination with the rotation locking member 302.

The swing member 311 is also provided with the swing member bulge 3111, and the swing member bulge 3111 is located between the first elastic strip 3121 and the second elastic strip 3122. When the swing member 311 is in the free swinging status, the swing member bulge 3111 is located at the side close to the second elastic strip 3122. The central angle between the swing member bulge 3111 and the end portion 3112 is an obtuse angle.

The second elastic strip 3122 is provided with the elastic member bulge 3124, the clastic member bulge 3124 is located on the side of the second elastic strip 3122 facing the swing member 311, and the elastic member bulge 3124 is used for limiting the swing member bulge 3111.

During the single operation circle of the hose/cord 400, the first elastic strip 3121 or the second elastic strip 3122 contacts the swing member 311 and applies a pressure to the swing member 311.

With swinging of the swing member 311, the swing member bulge 3111 is capable of passing over the elastic member bulge 3124 and is also capable of being limited by the elastic member bulge 3124, which thus provides a condition for realizing locking at the next stage.

In one of the embodiments, as shown in FIG. 12 to FIG. 14, FIG. 16, and FIG. 18 to FIG. 22, when the first rotating wheel 201 rotates in the first direction for the first time, the swing member bulge 3111 passes over the elastic member bulge 3124 and is limited by the elastic member bulge 3124.

When the first rotating wheel 201 rotates in the second direction for the first time, the swing member bulge 3111 passes back over the elastic member bulge 3124.

When the first rotating wheel 201 rotates in the first direction again, the swing member 311 is capable of swinging freely.

In the embodiment, during the single operation circle of the hose/cord 400, as shown in FIG. 18 and FIG. 19, when the first rotating wheel 201 rotates in the first direction for the first time, the swing member 311 is actuated, the first elastic strip 3121 contacts the swing member 311, the second elastic strip 3122 contacts the swing member bulge 3111, and the swing member bulge 3111 passes over the elastic member bulge 3124. After the actuating member 323 leaves the swing member 311, the first elastic strip 3121 and the second elastic strip 3122 work together to drive the swing member 311 to rotate reversely, so that the swing member bulge 3111 contacts the clastic member bulge 3124, and the swing member bulge 3111 is limited and stopped by the elastic member bulge 3124.

As shown in FIG. 20, when the first rotating wheel 201 rotates in the second direction for the first time, the first elastic strip 3121 is kept in contact with the swing member 311, and the second elastic strip 3122 is kept in contact with the swing member bulge 3111. The actuating member 323 actuates the swing member 311 backwards, so that the end portion 3112 of the swing member 311 moves downwardly, and the swing member bulge 3111 passes back over the elastic member bulge 3124. Finally, the end portion 3112 of the swing member 311 is engaged with the locking groove 324 of the rotation locking member 302 to realize locking.

As shown in FIG. 21, when the first rotating wheel 201 rotates in the first direction for the second time, the swing member bulge 3111 is out of contact with the second elastic strip 3122, and the first elastic strip 3121 and the second elastic strip 3122 both contact the swing member 311, so that the swing member 311 is capable of swinging freely between the first elastic strip 3121 and the second elastic strip 3122.

As shown in FIG. 22, when the first rotating wheel 201 rotates in the second direction for the second time, the swing member bulge 3111 faces the connecting strip 3123, the first clastic strip 3121 is out of contact with the swing member 311, and the second elastic strip 3122 contacts the swing member 311 to drive the swing member 311 to restore back to a resetting status.

Figure 17:
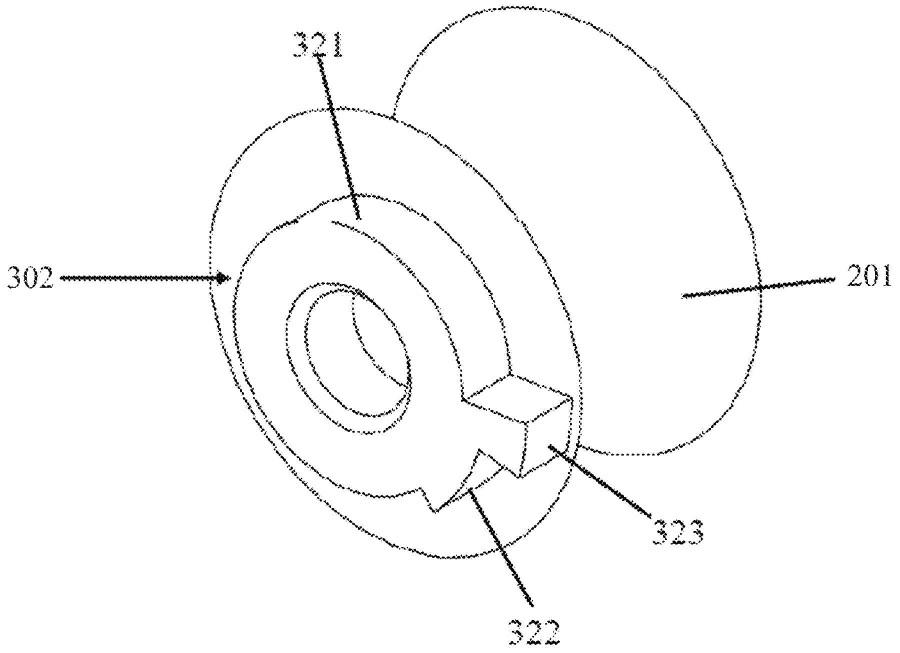
FIG. 17 is a schematic view that shows a rotation locking member arranged at one end of a first rotating wheel.

FIG. 17 is a schematic view that shows a rotation locking member arranged at one end of a first rotating wheel. In one of the embodiments, as shown in FIG. 14, FIG. 17, and FIG. 18 to FIG. 22, the rotation locking member 302 further includes a circular ring 321 arranged at one end of the first rotating wheel 201 and a boss 322 arranged on the circular ring 321.

The actuating member 323 is connected with the boss 322, and a locking groove 324 for locking the end portion 3112 of the swing member 311 is formed at the joint between the actuating member 323 and the boss 322.

When the first rotating wheel 201 rotates in the second direction for the first time, the end portion 3112 of the swing member 311 is located in the locking groove 324.

When the first rotating wheel 201 rotates in the first direction again, the end portion 3112 of the swing member 311 is capable of passing over the boss 322.

In the embodiment, the rotation locking member 302 includes the circular ring 321, the boss 322 and the actuating member 323. The circular ring 321 is arranged at one end of the first rotating wheel 201, the boss 322 is arranged on the circumferential surface of the circular ring 321, and the actuating member 323 is connected with the boss 322. The circular ring 321, the boss 322 and the actuating member 323 may be integrally formed with the first rotating wheel 201.

The locking groove 324 is formed at the joint between the actuating member 323 and the boss 322, for locking and stopping the end portion 3112 of the swing member 311.

In the embodiment, during the single operation circle of the hose/cord 400, as shown in FIG. 20, when the first rotating wheel 201 rotates in the second direction for the first time, the end portion 3112 of the swing member 311 is located in the locking groove 324 to lock and stop the first rotating wheel 201.

As shown in FIG. 21, when the first rotating wheel 201 rotates in the first direction again, the end portion 3112 of the swing member 311 is capable of passing over the boss 322, so that the swing member 311 may be in the free swinging status.

Figure 15:
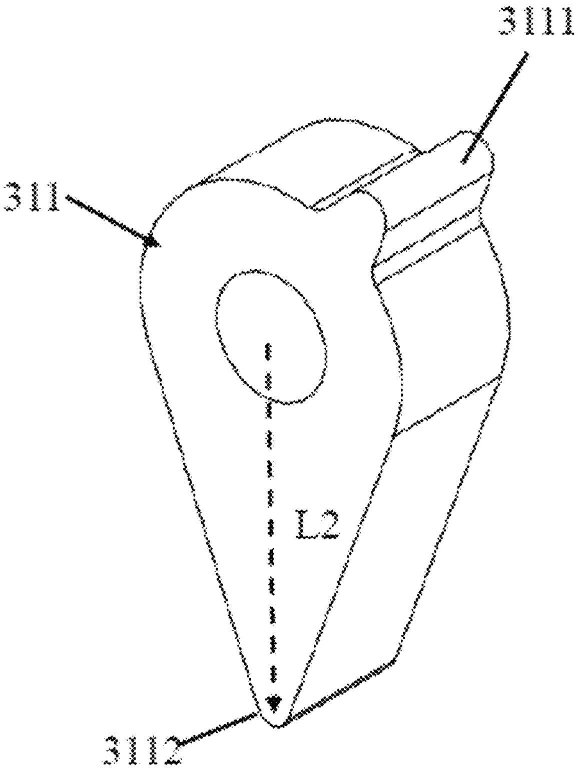
FIG. 15 is a perspective view of a swing member.

FIG. 15 is a perspective view of a swing member. In one of the embodiments, as shown in FIG. 14 and FIG. 15, the outer diameter of the circular ring 321 is R, the distance between the center of the circular ring 321 and the rotation center of the swing member 311 is L, the distance between the locking groove 324 and the center of the circular ring 321 is L1, and the distance from the end portion 3112 of the swing member 311 to the rotation center of the swing member 311 is L2. Then, L1+L2 is greater than L, and R+L2 is less than L.

In this way, when the end portion 3112 of the swing member 311 is located in the locking groove 324, the locking groove 324, the center shaft (the fixed shaft 104) of the first rotating wheel 201 and the pivot shaft 107 of the swing member 311 are in a triangular arrangement, so that the end portion 3112 of the swing member 311 is capable of being locked with the locking groove 324. When the end portion 3112 of the swing member 311 faces the circumferential surface of the circular ring 321, there is not contact between them, so that the swing member 311 may swing freely.

In one of the embodiments, as shown in FIG. 12 and FIG. 13, the fixed shaft 104 is arranged in the housing 110, and the first rotating wheel 201 is sleeved on the fixed shaft 104.

The second rotating wheel 202 is mounted in the housing 110 through a sliding shaft 221, the second rotating wheel 202 is sleeved on the sliding shaft 221, and the sliding shaft 221 is capable of moving towards the fixed shaft 104.

An clastic driving mechanism 106 for biasing the sliding shaft 221 towards the fixed shaft 104 is arranged between the housing 110 and the sliding shaft 221.

One end of the sliding shaft 221 is slidably connected with the front cover 101 and the other end is slidably connected with the rear cover 102. The elastic driving mechanism 106 is mounted on the front cover 101 and the rear cover 102, for biasing the sliding shaft 221 towards the fixed shaft 104, so that the second rotating wheel 202 is pushed towards the first rotating wheel 201, thereby clamping the hose/cord 400 passing between the second rotating wheel 202 and the first rotating wheel 201.

Due to its elastic deformability, the elastic driving mechanism 106 may self-adapt to the clearance required during pulling of the hose/cord 400 and may absorb the impulse force during movement of the sliding shaft 221.

In one of the embodiments, as shown in FIG. 12 and FIG. 13, corresponding to the two ends of the sliding shaft 221, guide grooves 105 extending towards the fixed shaft 104 are provided in the housing 110, respectively.

The two ends of the sliding shaft 221 are respectively in clearance fit with the two guide grooves 105.

In each guide groove 105, one elastic driving mechanism 106 is provided.

The guide grooves 105 extend in a horizontal direction, and the front cover 101 and the rear cover 102 are both provided with one guide groove 105. The two ends of the sliding shaft 221 are respectively fitted in the two guide grooves 105, and the end portions of the sliding shaft 221 are in clearance fit or in sliding connection with the guide grooves 105, so that the sliding shaft 221 may slide linearly along the guide grooves 105. Each guide groove 105 is provided with one clastic driving mechanism 106, which can improve the stability of driving the sliding shaft 221 to move.

In one of the embodiments, as shown in FIG. 12 and FIG. 13, the elastic driving mechanism 106 includes a jacking block 161 for abutting against the sliding shaft 221 and an elastic member 162 for biasing the jacking block 161 towards the sliding shaft 221.

The jacking block 161 is slidably arranged in the guide groove 105, one end of the clastic member 162 is fixed to the housing 110, and the other end is kept in contact with the jacking block 161.

A guide-rail groove is arranged in the guide groove 105, a guide rail or a rib is arranged on the jacking block 161, and by matching the guide rail or the rib with the guide-rail groove guidance is provided for the sliding of the jacking block 161 in the guide groove 105.

One end of the elastic member 162 is fixed to the front cover 101 or the rear cover 102 of the housing 110, and the other end is kept in contact with the jacking block 161, so that the jacking block 161 may be biased towards the sliding shaft 221, thus causing the jacking block 161 to abut against the sliding shaft 221 and push the sliding shaft 221 to move towards the fixed shaft 104 or limiting the sliding shaft 221.

In one of the embodiments, as shown in FIG. 12, a first friction sleeve 203 is mounted on the first rotating wheel 201 and a second friction sleeve 204 is mounted on the second rotating wheel 202.

Rough surfaces of the first friction sleeve 203 and the second friction sleeve 204 may provide greater friction force, which is beneficial for clamping the hose/cord 400 therebetween on one hand, and is beneficial for driving the first rotating wheel 201 and the second rotating wheel 202 to rotate when the hose/cord 400 is pulled and moved on the other hand.

The first friction sleeve 203 and the second friction sleeve 204 may be rubber sleeves, which is elastic, and can not only provide a friction to clamp the hose/cord 400, but also provide protection for the hose/cord 400.

Since the first rotating wheel 201 and the second rotating wheel 202 are respectively located at two sides of the hose/cord 400, rotation directions of the first rotating wheel 201 and the second rotating wheel 202 are opposite.

Figure 23:
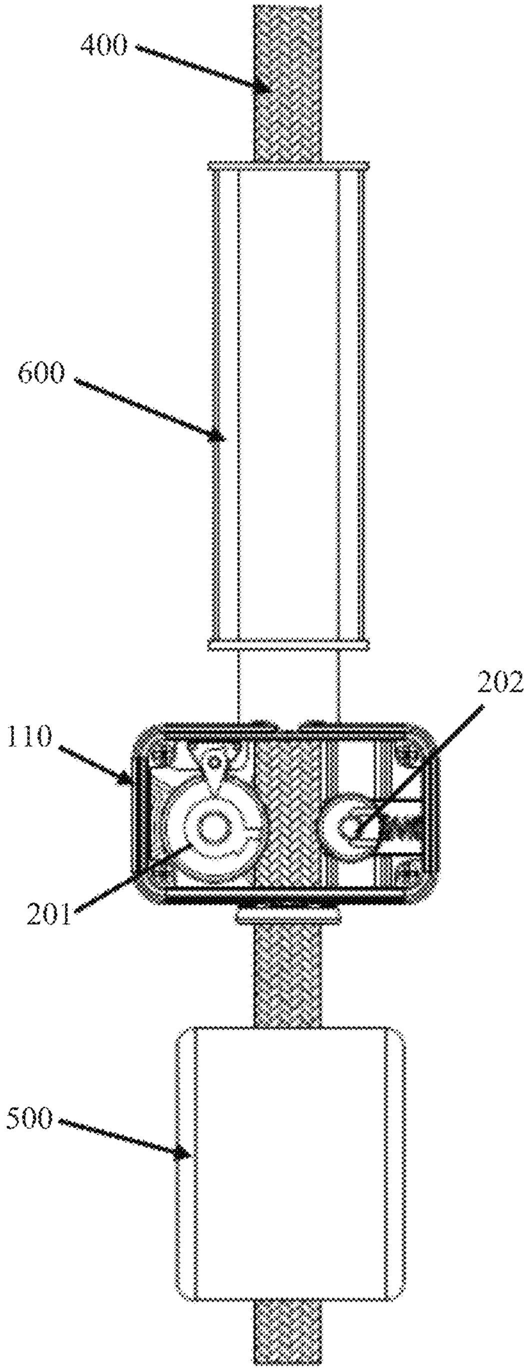
FIG. 23 is a schematic structural view of a pull-out device provided by an embodiment of the present disclosure.

FIG. 23 is a schematic structural view of a pull-out device provided by an embodiment of the present disclosure. As shown in FIG. 23, an embodiment of the present disclosure provides a pull-out device, which includes the hose/cord 400 and the pull-out control mechanism according to any one of the embodiments above.

Two opposite sides of the housing 110 are respectively provided with a housing through hole 103 for the hose/cord 400 to pass through.

The hose/cord 400 passes through the housing through holes 103 and passes between the first rotating wheel 201 and the second rotating wheel 202.

When the hose/cord 400 is pulled outwardly for the first time, the first rotating wheel 201 rotates in the first direction for the first time, the actuating member 323 is capable of actuating the swing member 311 in the first direction and passing over the swing member 311, and the hose/cord 400 is capable of being pulled out.

When the hose/cord 400 is released for the first time, the first rotating wheel 201 rotates in the second direction for the first time, the actuating member 323 is capable of actuating the swing member 311 in the second direction, the swing member 311 is locked together with the rotation locking member 302, and the hose/cord 400 is capable of being clamped and positioned/limited by the hose/cord clamping wheel set 210.

When the hose/cord 400 is pulled outwardly again, the first rotating wheel 201 rotates in the first direction again, the swing member 311 is disengaged with the rotation locking member 302, and the swing member 311 is in a free swinging status.

When the hose/cord 400 is released again, the first rotating wheel 201 rotates in the second direction again, the actuating member 323 is capable of passing over the swing member 311 that is in the free swinging status, and the hose/cord 400 is capable of being restored to its original position.

The pull-out device provided by the present disclosure includes the hose/cord 400 and the pull-out control mechanism.

As for the structure, the construction and the working principle of the pull-out control mechanism, please refer to the previous description of the pull-out control mechanism, which will not be repeated herein.

The pull-out device provided by the present disclosure is mainly used for controlling a pull-out operation of a hose or a cord and may be used in a pull-out faucet. When the pull-out device is used in a pull-out faucet, the hose passing between the first rotating wheel 201 and the second rotating wheel 202 is a water supply hose.

A top portion and a bottom portion of the housing 110 are respectively provided with the housing through holes 103 for the hose/cord 400 to pass through. The housing through hole 103 should be aligned with the passage 220. A sleeve 600 is mounted on the top portion of the housing 110, a weighting block 500 is mounted on the hose/cord 400, and the weighting block 500 is located below the housing 110.

During the single operation circle of the hose/cord 400, the operation status or mode of the locking and releasing mechanism 300 and the hose/cord clamping wheel set 210 is as follows.

As shown in FIG. 18, when the hose/cord 400 is pulled outwardly or upwardly for the first time, under the driving of the hose/cord 400, the first rotating wheel 201 rotates in the first direction (the counterclockwise direction in FIG. 18) for the first time, and the actuating member 323 is capable of actuating the swing member 311 in the first direction and passing over the swing member 311. In this status, the first rotating wheel 201 is capable of rotating in the first direction by any angle or any number of turns, and the hose/cord 400 is capable of being pulled out.

After the hose/cord 400 is pulled out to a desired length, it is necessary to temporarily position the hose/cord 400 in place, so that the hose/cord 400 is suspended to avoid being drawn back by the weighting block 500 attached below, and the following operations are employed.

After the hose/cord 400 is pulled out to the desired length, the hose/cord 400 is released, and no external force is applied to pull the hose/cord 400 again. When the hose/cord 400 is released for the first time, the hose/cord 400 moves downwardly under the action of the weighting block 500 shown in FIG. 23 and drives the first rotating wheel 201 to rotate in the second direction (the clockwise direction shown in FIG. 19) for the first time. Accordingly, the actuating member 323 actuates the swing member 311 in the second direction (that is, to actuate the swing member 311 backwards). As shown in FIG. 20, under the action of the actuating member 323, the end portion 3112 of the swing member 311 is locked together with a locking groove or a locking mechanism on the rotation locking member 302. At the moment, the first rotating wheel 201 cannot rotate, and the hose/cord 400 is clamped and positioned/limited by the hose/cord clamping wheel set 210, so that the hose/cord 400 does not need to be drawn by hand, and the hose/cord 400 is located in a designated position, which is convenient for a user to use.

When the user needs to restore the hose/cord 400 back to its original position, the following operations are employed.

As shown in FIG. 21, when the hose/cord 400 is pulled outwardly or upwardly again or for the second time, the first rotating wheel 201 rotates in the first direction again or for the second time under the driving of the hose/cord 400, and the end portion 3112 of the swing member 311 is disengaged with the locking groove 324 of the rotation locking member 302 to realize unlocking. At the moment, the swing member 311 is in a free swinging status. When the swing member 311 is in the free swinging status, the actuating member 323 is capable of passing over the swing member 311 that is in the free swinging status regardless of whether the first rotating wheel 201 rotates in the first direction or in the second direction, and the swing member 311 will not be locked or stopped by the rotation locking member 302.

As shown in FIG. 22, after the swing member 311 is disengaged with the rotation locking member 302, the user releases the hose/cord 400 again, the first rotating wheel 201 rotates in the second direction again or for the second time, and the actuating member 323 may pass over the swing member 311 that is in the free swinging status. The first rotating wheel 201 may rotate in the second direction by any angle or any number of turns, and thus the hose/cord 400 is restored back to its original position under the driving of the weighting block 500.

Therefore, the pull-out device provided by the present disclosure can realize suspending and positioning of the hose/cord without having to draw the hose/cord by an external force, which is thus easy and convenient to operate and has high practicability.

If desired, the above technical solutions may be combined to achieve the best technical effect.

In sum, the present disclosure also discloses a pull-out control mechanism and a pull-out device. The pull-out control mechanism includes a housing; a hose/cord clamping wheel set including a first rotating wheel and a second rotating wheel, which are mounted in the housing; and a locking and releasing mechanism including a swing locking member mounted on the housing and a rotation locking member mounted on the first rotating wheel, the swing locking member includes a swing member capable of swinging in the housing, and the rotation locking member includes an actuating member capable of actuating the swing member. The pull-out control mechanism and the pull-out device disclosed by the present disclosure can realize suspending and positioning of a hose/cord without having to draw the hose/cord by an external force, which are easy and convenient to operate and have high practicability.

The above described is only the principle and the embodiments of the present disclosure. It should be noted that for those of ordinary skill in the art, several other variations can be made on the basis of the principle of the present disclosure, which should also be regarded as falling into the scope of protection of the present disclosure.

I claim:

1. A pull-out control mechanism, comprising:

a swing locking member comprising a swing member configured to swing;

a first rotating wheel configured to rotate relative to the swing locking member; and a rotation locking member disposed on the first rotating wheel, the rotation locking member comprising an actuating member configured to actuate the swing member in response to a rotation of the first rotating wheel, wherein the actuated swing member is configured to be locked or disengaged with the actuating member, wherein when the first rotating wheel rotates in a first direction for a first time, the actuating member actuates the swing member in the first direction and passes over the swing member, wherein when the first rotating wheel rotates in a second direction opposite to the first direction for a first time, the actuating member actuates the swing member in the second direction, and the swing member is locked with the rotation locking member, wherein when the first rotating wheel rotates in the first direction for a second time, the swing member is disengaged with the rotation locking member, and the swing member is in a free swinging status, and wherein when the first rotating wheel rotates in the second direction for a second time, the actuating member passes over the swing member in the free swinging status.

2. The pull-out control mechanism according to claim 1, wherein the swing locking member further comprises an elastic member and configured to bias the swing member, wherein the elastic member comprises a first elastic strip and a second elastic strip spaced apart from each other, wherein a pivot shaft of the swing member is disposed between the first elastic strip and the second elastic strip, wherein an end portion of the swing member extends out from an opening between the first elastic strip and the second elastic strip, wherein the swing member comprises a swing member bulge located between the first elastic strip and the second elastic strip, wherein an elastic member bulge is arranged on one side of the second elastic strip facing the swing member, and wherein the swing member bulge is configured to pass over the elastic member bulge and is configured to be limited by the elastic member bulge.

3. The pull-out control mechanism according to claim 2, wherein when the first rotating wheel rotates in a first direction for a first time, the swing member bulge passes over the elastic member bulge and is limited by the elastic member bulge, wherein when the first rotating wheel rotates in a second direction for a first time, the swing member bulge passes back over the elastic member bulge, and wherein when the first rotating wheel rotates in the first direction for a second time, the swing member swings freely.

4. The pull-out control mechanism according to claim 3, further comprising a housing, wherein the elastic member further comprises a connecting strip connected between the first elastic strip and the second elastic strip and configured to be connected to the housing, wherein the pivot shaft is disposed in a space formed by the first elastic strip, the second elastic strip, and the connecting strip, and wherein the swing member bulge faces the connecting strip.

5. The pull-out control mechanism according to claim 1, wherein the rotation locking member comprises a circular ring arranged at one end of the first rotating wheel and a boss arranged on the circular ring, wherein the actuating member is connected with the boss, and a locking groove configured to lock an end portion of the swing member is formed at a joint portion between the actuating member and the boss, wherein when the first rotating wheel rotates in a second direction for a first time, the end portion of the swing member is located in the locking groove, and wherein when the first rotating wheel rotates in a first direction for a second time, the end portion of the swing member passes over the boss.

6. The pull-out control mechanism according to claim 5, wherein an outer diameter of the circular ring is R, a distance between a center of the circular ring and a rotation center of the swing member is L, a distance between the locking groove and the center of the circular ring is L1, and a distance from the end portion of the swing member to the rotation center of the swing member is L2, and wherein L1+L2 is greater than L, and R+L2 is less than L.

7. The pull-out control mechanism according to claim 1, further comprising a housing and a second rotating wheel, wherein a fixed shaft is arranged in the housing, and the first rotating wheel is sleeved on the fixed shaft, wherein the second rotating wheel is mounted in the housing through a sliding shaft, the second rotating wheel is sleeved on the sliding shaft, and the sliding shaft is configured to move toward the fixed shaft, and wherein an elastic driving mechanism configured to bias the sliding shaft toward the fixed shaft is arranged between the housing and the sliding shaft.

8. The pull-out control mechanism according to claim 7, wherein corresponding to two ends of the sliding shaft, guide grooves extending toward the fixed shaft are provided in the housing respectively, wherein the two ends of the sliding shaft are respectively engaged with the two guide grooves, and wherein one elastic driving mechanism is provided in each guide groove.

9. The pull-out control mechanism according to claim 8, wherein the elastic driving mechanism comprises a jacking block configured to abut against the sliding shaft and an elastic member configured to bias the jacking block toward the sliding shaft, and wherein the jacking block is slidably arranged in the guide groove, one end of the elastic member is fixed to the housing, and the other end of the elastic member is kept in contact with the jacking block.

10. The pull-out control mechanism according to claim 7, wherein a passage is formed between the first rotating wheel and the second rotating wheel and configured to allow a hose to pass through and allow the hose to be clamped by the first rotating wheel and the second rotating wheel.

11. The pull-out control mechanism according to claim 10, wherein the housing comprises two housing through holes respectively disposed on a top portion of the housing and a bottom portion of the housing, and wherein the two housing through holes are aligned with the passage.

12. The pull-out control mechanism according to claim 10, further comprising:

a first friction sleeve disposed on the first rotating wheel; and a second friction sleeve disposed on the second rotating wheel, wherein the first friction sleeve and the second friction sleeve are configured to provide friction forces to the hose when the hose moves in the passage, and wherein the first rotating wheel and the second rotating wheel are rotated when the hose moves in the passage.

13. A pull-out device, comprising:

a pull-out control mechanism comprising:

a housing comprising two housing through holes respectively disposed on a top portion of the housing and a bottom portion of the housing, a swing locking member comprising a swing member configured to swing;

a first rotating wheel disposed in the housing configured to rotate relative to the swing locking member;

a second rotating wheel disposed in the housing; and a rotation locking member disposed on the first rotating wheel, the rotation locking member comprising an actuating member configured to actuate the swing member in response to a rotation of the first rotating wheel; and a hose configured to pass through the housing through holes, the first rotating wheel, and the second rotating wheel.

14. The pull-out device according to claim 13, further comprising:

a weighting block configured to be connected to the hose and disposed below the housing, wherein the hose is configured to move downwards under an action of the weighting block.

15. The pull-out device according to claim 13, wherein a fixed shaft is arranged in the housing, and the first rotating wheel is sleeved on the fixed shaft, wherein the second rotating wheel is mounted in the housing through a sliding shaft, the second rotating wheel is sleeved on the sliding shaft, and the sliding shaft is configured to move toward the fixed shaft, and wherein an elastic driving mechanism configured to bias the sliding shaft toward the fixed shaft is arranged between the housing and the sliding shaft.

16. The pull-out control mechanism according to claim 15, wherein a passage is formed between the first rotating wheel and the second rotating wheel and configured to allow the hose to pass through and allow the hose to be clamped by the first rotating wheel and the second rotating wheel.

17. The pull-out control mechanism according to claim 16, further comprising a first friction sleeve disposed on the first rotating wheel; and a second friction sleeve disposed on the second rotating wheel, wherein the first friction sleeve and the second friction sleeve are configured to provide friction forces to the hose when the hose moves in the passage, and wherein the first rotating wheel and the second rotating wheel are rotated when the hose moves in the passage, and wherein the two housing through holes are aligned with the passage.

18. A method for locking a hose in a position and returning the hose to an initial position, the method comprising:

moving the hose from the initial position to a desired position by controlling a rotating wheel to rotate in a first direction for a first time in response to a first-time pulling of the hose;

locking the hose at the desired position by controlling the rotating wheel to rotate in a second direction opposite to the first direction for a first time in response to a first-time releasing of the hose;

unlocking the hose by controlling the rotating wheel to rotate in the first direction for a second time in response to a second-time pulling of the hose; and returning the hose to the initial position by controlling the rotating wheel to rotate in the second direction for a second time in response to a second-time releasing of the hose.

19. The method according to claim 18, wherein moving the hose from the initial position to the desired position by controlling the rotating wheel to rotate in the first direction for the first time in response to the first-time pulling of the hose comprises:

actuating, by an actuating member of a rotation locking member, a swing member in the first direction; and passing, by the actuating member, over a swing member, wherein locking the hose at the desired position by controlling the rotating wheel to rotate in a second direction opposite to the first direction for a first time in response to a first-time releasing of the hose comprises:

actuating, by an actuating member, the swing member in the second direction under an action of a weighting block; and engaging the swing member with the rotation locking member, wherein unlocking the hose by controlling the rotating wheel to rotate in the first direction for the second time in response to the second-time pulling of the hose comprises:

disengaging the swing member with the rotation locking member to make the swing member in a free swinging status, and wherein returning the hose to the initial position by controlling the rotating wheel to rotate in the second direction for the second time in response to the second-time releasing of the hose comprises:

passing, by the actuating member, over the swing member in the free swinging status under the action of the weighting block.

* * * * *